US006296182B1

(12) United States Patent
Ota et al.

(10) Patent No.: US 6,296,182 B1
(45) Date of Patent: Oct. 2, 2001

(54) BANKNOTE-PROCESSING DEVICE WITH CARD READER/WRITER FUNCTION

(75) Inventors: Michihiro Ota, Sakado; Hiroaki Yoshida, Tsurugashima, both of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/264,100

(22) Filed: Mar. 8, 1999

(30) Foreign Application Priority Data

| | | |
|---|---|---|
| Mar. 9, 1998 | (JP) | 10-056890 |
| May 19, 1998 | (JP) | 10-136919 |
| May 19, 1998 | (JP) | 10-137262 |
| Nov. 13, 1998 | (JP) | 10-323740 |

(51) Int. Cl.[7] .......... G06F 17/60; G06K 19/06

(52) U.S. Cl. .......... 235/379; 235/381; 235/492; 235/451

(58) Field of Search .......... 235/492, 379, 235/381, 451, 449; 705/41, 43

(56) References Cited

U.S. PATENT DOCUMENTS

| | | | | |
|---|---|---|---|---|
| 4,669,596 | * | 6/1987 | Capers et al. | 194/210 |
| 5,195,739 | * | 3/1993 | Watabe | 271/207 |
| 5,454,332 | * | 10/1995 | Fennelly et al. | 109/19 |
| 5,635,696 | * | 6/1997 | Dabrowski | 235/449 |
| 5,679,945 | * | 10/1997 | Renner et al. | 235/492 |
| 5,709,293 | * | 1/1998 | Ishida et al. | 194/200 |
| 5,887,695 | * | 3/1999 | Hatamachi et al. | 194/207 |
| 5,929,414 | * | 7/1999 | Saitoh | 235/380 |
| 6,016,954 | * | 1/2000 | Abe et al. | 235/379 |

* cited by examiner

*Primary Examiner*—Michael G. Lee
*Assistant Examiner*—Jamara A. Franklin
(74) *Attorney, Agent, or Firm*—Hogan & Hartson, LLP

(57) ABSTRACT

To provide a banknote-processing device with an IC card reader/writer function, a card reader/writer which records and reproduces information to and from the IC recording area of an IC card is fitted within the front mask where the banknote insertion slot is formed, or within a front mask cover which serves to cover this front mask.

13 Claims, 25 Drawing Sheets

BANKNOTE-PROCESSING DEVICE WITH CARD READER/WRITER FUNCTION

BACKGROUND OF THE INVENTION

1. Field of the Invention

The present invention relates to a coin-processing device for use in automatic vending machines, money changing machines, self-service machines and similar apparatus, which identifies inserted banknotes as authentic or counterfeit, and stores the authentic banknotes. It relates in particular to a banknote-processing device provided with an IC card reader/writer.

2. Description of the Related Art

Generally, automatic vending machines, money changing machines, self-service machines and similar apparatus which handle banknotes for the purpose of purchasing goods and other services are equipped with a banknote-processing device, which serves to identify inserted banknotes as authentic or counterfeit and store authentic banknotes in a stacker.

Meanwhile, in recent years it has become increasingly common to purchase goods from an automatic vending machine not by using currency, but by using so-called IC cards on which monetary and other information is recorded within an IC recording area.

When an IC card of this sort is to be used for the purpose of purchasing goods, a card reader/writer must be installed within the automatic vending or self-service machine to allow access to the IC recording area of the card in order to record or reproduce the monetary and other information stored there.

Currently there are proposals for various forms of access from the card reader/writer to the IC card, including non-contact access via an antenna or other means of communication, access by way of direct contact with the IC recording area, and a combination of the two.

Meanwhile, there are proposals for various types of card to correspond to each of these types of access to the card reader/writer. These include cards having an embedded antenna which relays information from the IC recording area without contact, those which relay information directly through contact with the card reader/writer, and those which have a combination of both functions.

When viewed from the perspective of the automatic vending or self-service machine to which the banknote-processing device is fitted, there is no particular problem of installation space so long as only a card reader/writer is installed within the automatic vending or self-service machine. However, when a card reader/writer is to be installed in an automatic vending machine where a banknote-processing device or coin-processing device is provided as conventional vending machine or self-service machine, it becomes necessary to conserve space within the automatic vending or self-service machine for the card reader/writer. Thus, there arises a problem that the storage space for goods within the automatic vending or self-service machine, which is already restricted, will become even more restricted so that it will become impossible to ensure sufficient space for storing goods within the machine.

SUMMARY OF THE INVENTION

With a view to solving the abovementioned problem, it is an object of the present invention to provide a banknote-processing device having an IC card reader/writer.

In order to achieve this object, in the first banknote-processing device with a card reader/writer function to which the present invention pertains, a card reader/writer for the purpose of recording and reproducing information to and from the IC recording area of an IC card is fitted within the front mask, where the banknote insertion slot is formed.

In the second banknote-processing device with a card reader/writer function to which the present invention pertains, an antenna for the purpose of communicating with the IC card is provided within the front mask, where the banknote insertion slot is formed, and a card holder for the purpose of housing the IC card is provided on the front mask cover with which the front mask is covered.

In the third banknote-processing device with a card reader/writer function to which the present invention pertains, a card reader/writer for the purpose of recording and reproducing information to and from the IC recording area of an IC card is provided within the front mask cover which covers the front mask where the banknote insertion slot is formed, and this front mask cover is capable of being attached and detached freely.

DESCRIPTION OF THE PREFERRED EMBODIMENTS

Figure 1:
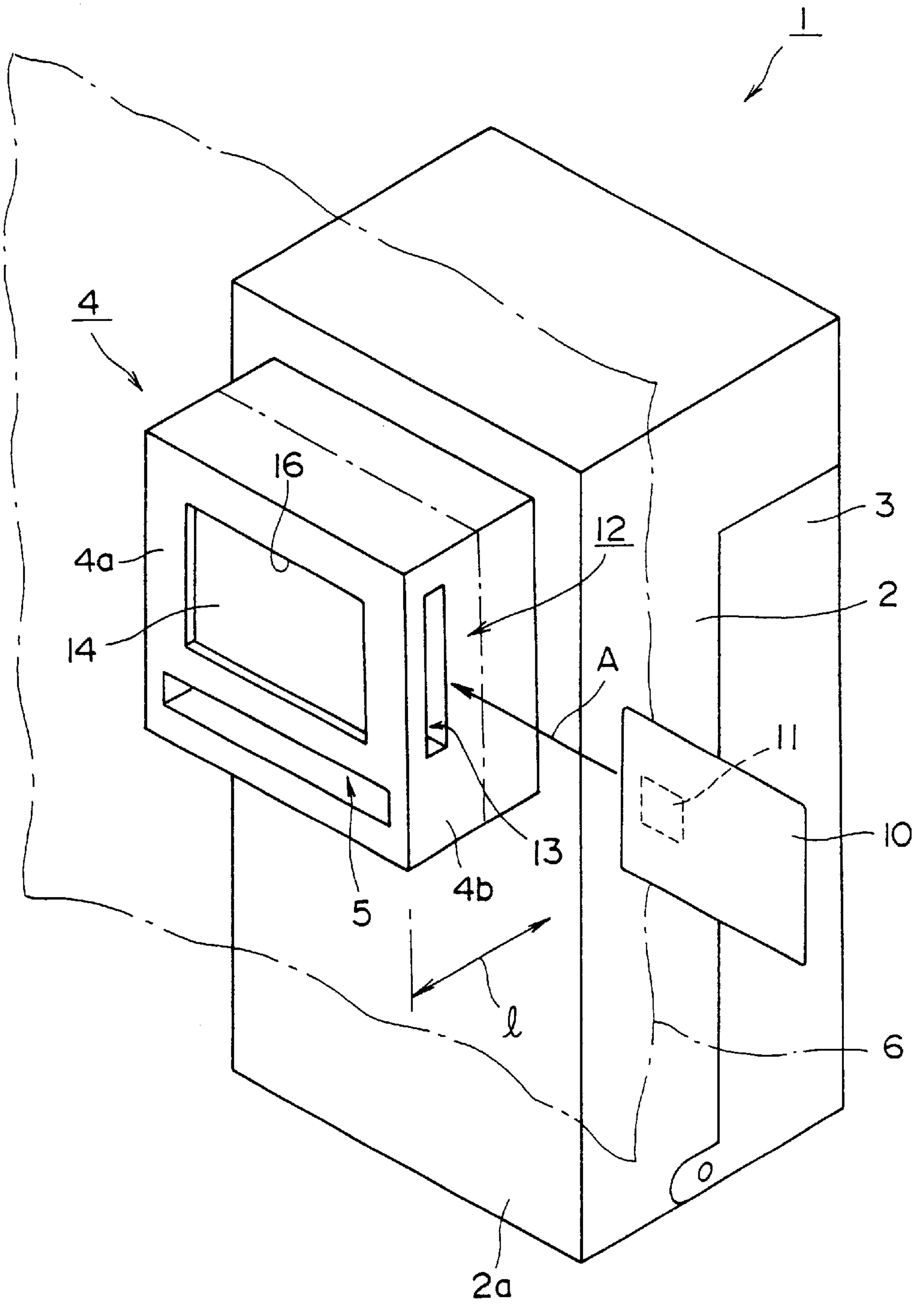
FIG. 1 is a schematic perspective view of the first banknote-processing device with a card reader/writer function to which the present invention pertains.

There follows a detailed description of embodiments of the banknote-processing device with a card reader/writer function to which the present invention pertains while referring to the drawings.

FIG. 1 is a schematic perspective view of the first banknote-processing device with a card reader/writer function 1 (hereinafter referred to simply as a banknote-processing device 1).

The banknote-processing device 1 comprises a body 2 and a stacker 3 for housing banknotes, which is located at the rear, opening and closing freely in relation to the body 2.

To a front 2*a* of the body 2 is attached a front mask 4, which partially covers the front 2*a* and can be attached and detached freely.

Towards the bottom of a front 4*a* of the front mask 4 is formed a banknote insertion slot 5 into which banknotes (not depicted in the drawing) are inserted.

It should be added that the front 4*a* of the front mask 4 is formed in such a manner as to protrude outwards from a door 6 of the automatic vending machine, which is not depicted in the drawing.

Meanwhile, towards the top of the front mask 4 is located a card reader/writer 12, which serves to record and reproduce information to and from an IC recording area 11 of an IC card 10.

Figure 2:
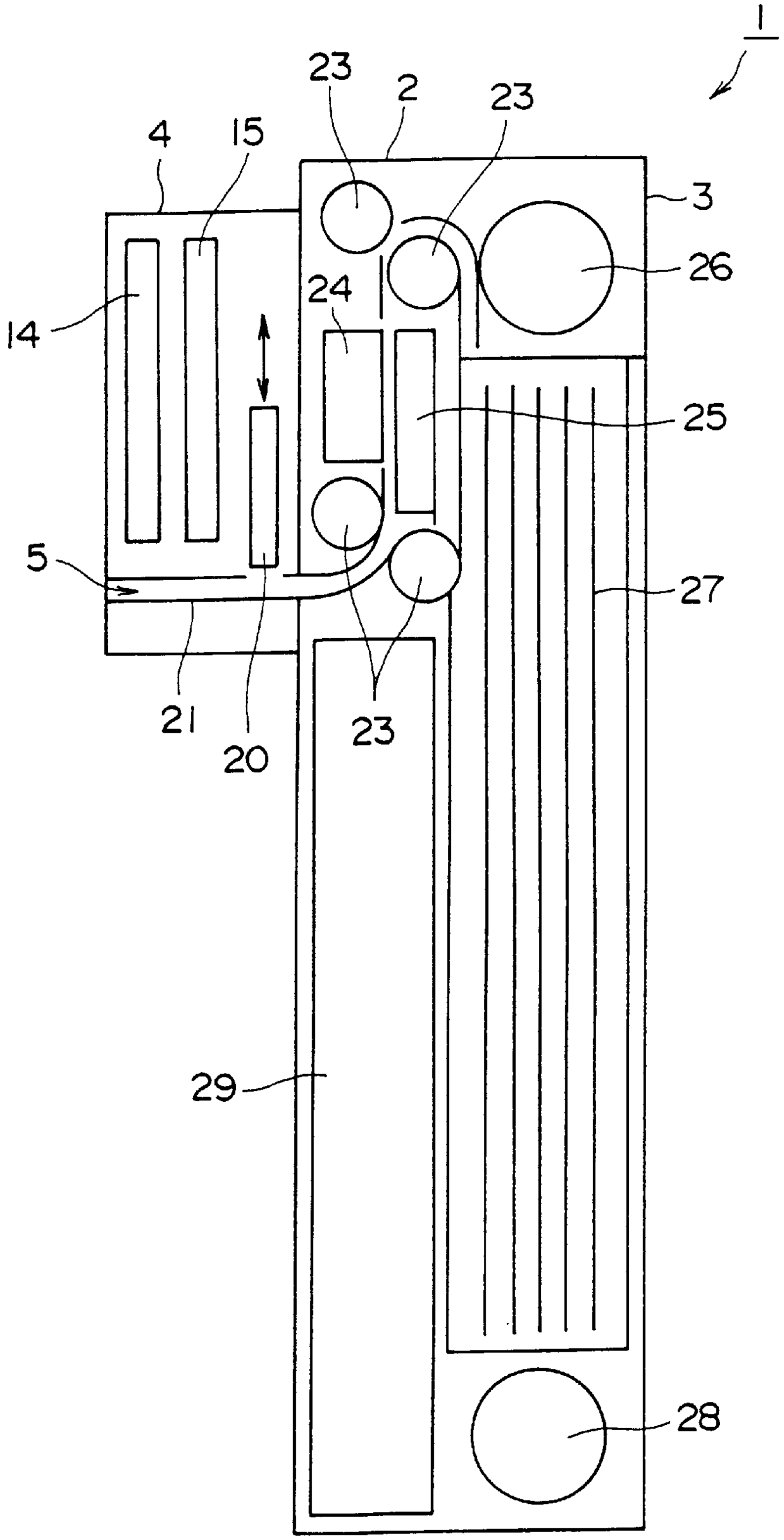
FIG. 2 is a schematic cross-sectional view of FIG. 1.

The card reader/writer 12 comprises a card insertion slot 13 formed on a right-hand side 4*b* of the front mask 4, a card holder 14 formed within the front mask 4, and information access means 15 located at the rear of the card holder 14 as can be seen from FIG. 2, which is a schematic cross-sectional view of FIG. 1.

In the embodiment, the IC card 10 is of the type which relays information from the IC recording area 11 to the information access means 15 without contact, having within it a coil or similar member serving as an antenna. The information access means 15 of the card reader/writer 12 is of the type which accesses the IC recording area 11 of the IC card 10 without contact by means of an antenna or other means of communication. As FIG. 1 shows, a window 16 is formed in the front 4*a* of the front mask 4 opposing to the card holder 14 in order to expose part of the surface of the inserted IC card 10.

Symbol 20 in FIG. 2 denotes a shutter which is capable of moving upwards and downwards to allow a banknote guide chute 21 to open and close. The banknote guide chute 21 is located within the front mask 4 and is connected to the banknote insertion slot 5. Symbol 23 denotes banknote transport rollers which serve to transport the banknotes along the banknote guide chute 21. Symbols 24, 25 denote banknote identifying means, and comprise magnetic sensors, photosensors or the like which serve to identify authentic and counterfeit banknotes. Symbol 26 is a banknote transport motor which serves to drive the banknote transport rollers 23, while 27 denotes banknotes stacked and stored within the stacker 3. Symbol 28 denotes a motor for driving the stacker, and 29 is a control board housing unit which houses the control board on which the various circuitry is formed.

There now follows a description of the action of the banknote-processing device 1.

When a banknote (not depicted in the drawings) is inserted through the banknote insertion slot 5, the shutter 20 moves upwards in response to a detection signal from a sensor (not depicted in the drawings). The banknote transport rollers 23 rotate, transporting the banknote to the banknote identifying means 24, 25.

If the banknote which has been transported to the banknote identifying means 24, 25 is authentic, it carries on downstream in the banknote guide chute 21 to be stacked and stored in the stacker 3.

If the banknote which has been transported to the banknote identifying means 24, 25 is judged to be counterfeit, banknote transport rollers 23 rotate in the reverse direction and the banknote is returned through the banknote insertion slot 5.

Meanwhile, if an IC card 10 is used, it is inserted into the card insertion slot 13 in a direction at right-angles to the direction in which the banknote (not depicted in the drawings) is inserted, as is demonstrated by the arrow A in FIG. 1.

Figure 3:
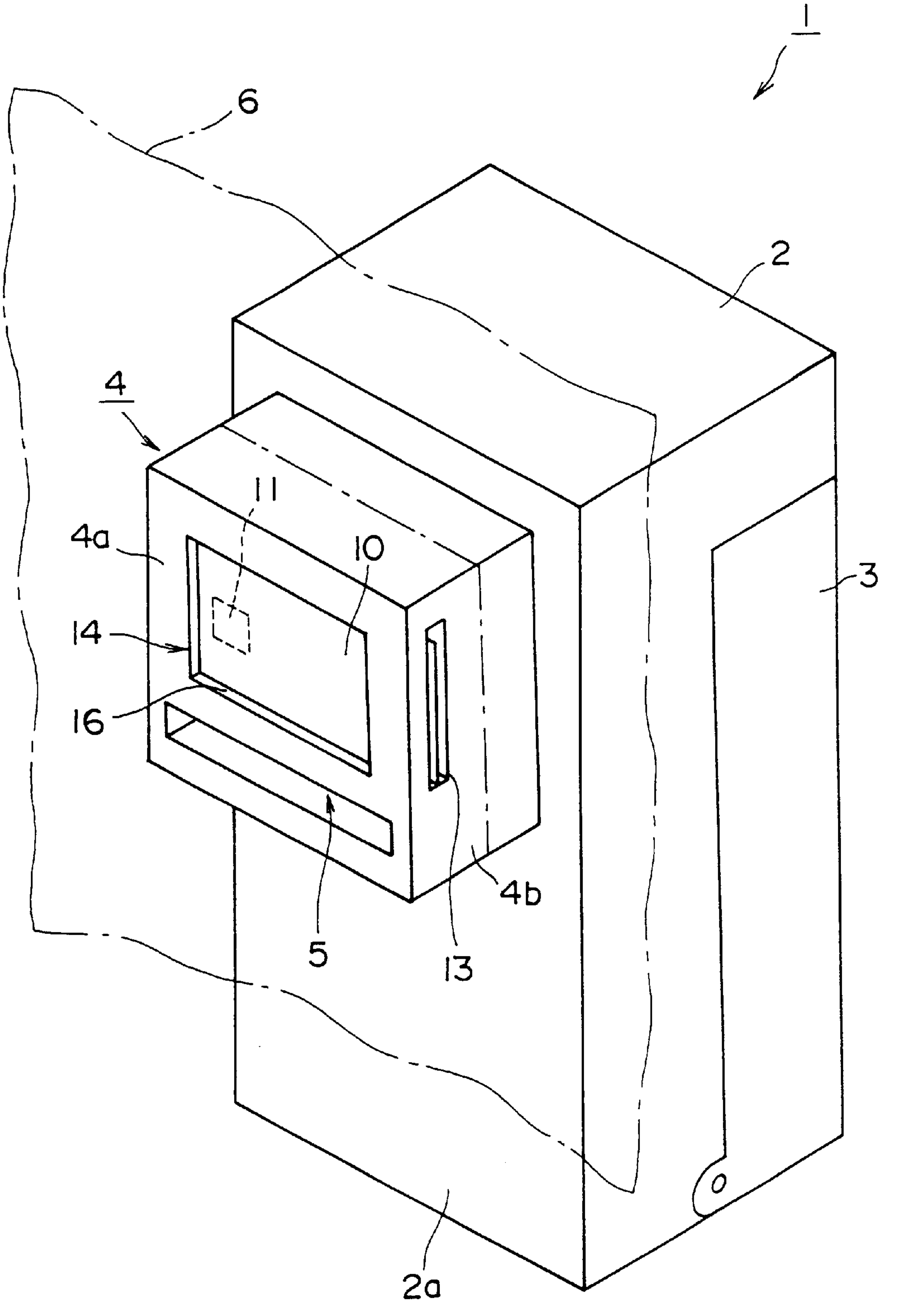
FIG. 3 is a schematic perspective view illustrating the action of the first banknote-processing device with a card reader/writer function to which the present invention pertains.

When the IC card 10 is inserted into the card insertion slot 13, it is aligned in the prescribed position within the card holder 14, as FIG. 3 demonstrates.

In this case, a latch (not depicted in the drawings) comprising an engaging claw or the like, engages with the trailing edge of the IC card 10 in order to prevent the card 10 from being removed from the card holder 14 during processing.

Thus, once the IC card 10 has been aligned in the prescribed position within the card holder 14, it is detected by the sensor (not depicted in the drawings), and a detection signal from this sensor allows access to the IC information area 11 to be initiated without contact by way of the information access means 15 (FIG. 2) located at the rear of the card holder 14. In this manner, information is recorded and reproduced to and from the IC card 10.

When the information has been recorded and reproduced to and from the IC card 10, a signal signifying that the process is complete allows the card latch (not depicted in the drawings) to be released, and energising means (not depicted in the drawings) located within the card holder 14 causes the trailing edge of the IC card 10 to protrude from the card insertion slot 13, so that the operator can easily remove the processed card 10 from the card insertion slot 13.

In the above embodiment, a window 16 is formed in the card holder 14, making it easy to confirm whether or not an IC card 10 has been inserted into the card holder 14. This means that it is possible to avoid as far as is feasible a situation where the operator forgets to remove an IC card which has been inserted into the card holder 14.

It should be added that in the above embodiment the IC card 10 is inserted completely into the card holder 14, where a latch (not depicted in the drawings) engages with its trailing edge, preventing it from being removed during the process of recording and reproducing information to and from the IC card 10. However, the present invention is in no way restricted to the above embodiment, and it is also possible to structure it in such a manner that the card holder 14 is shorter in the longitudinal direction of the IC card 10, so that when the IC card 10 is inserted into the card holder 14 its trailing edge always protrudes from the card holder 14, making it easier to remove the IC card 10 from the card holder 14 once the process of recording and reproducing information is complete.

Figure 4:
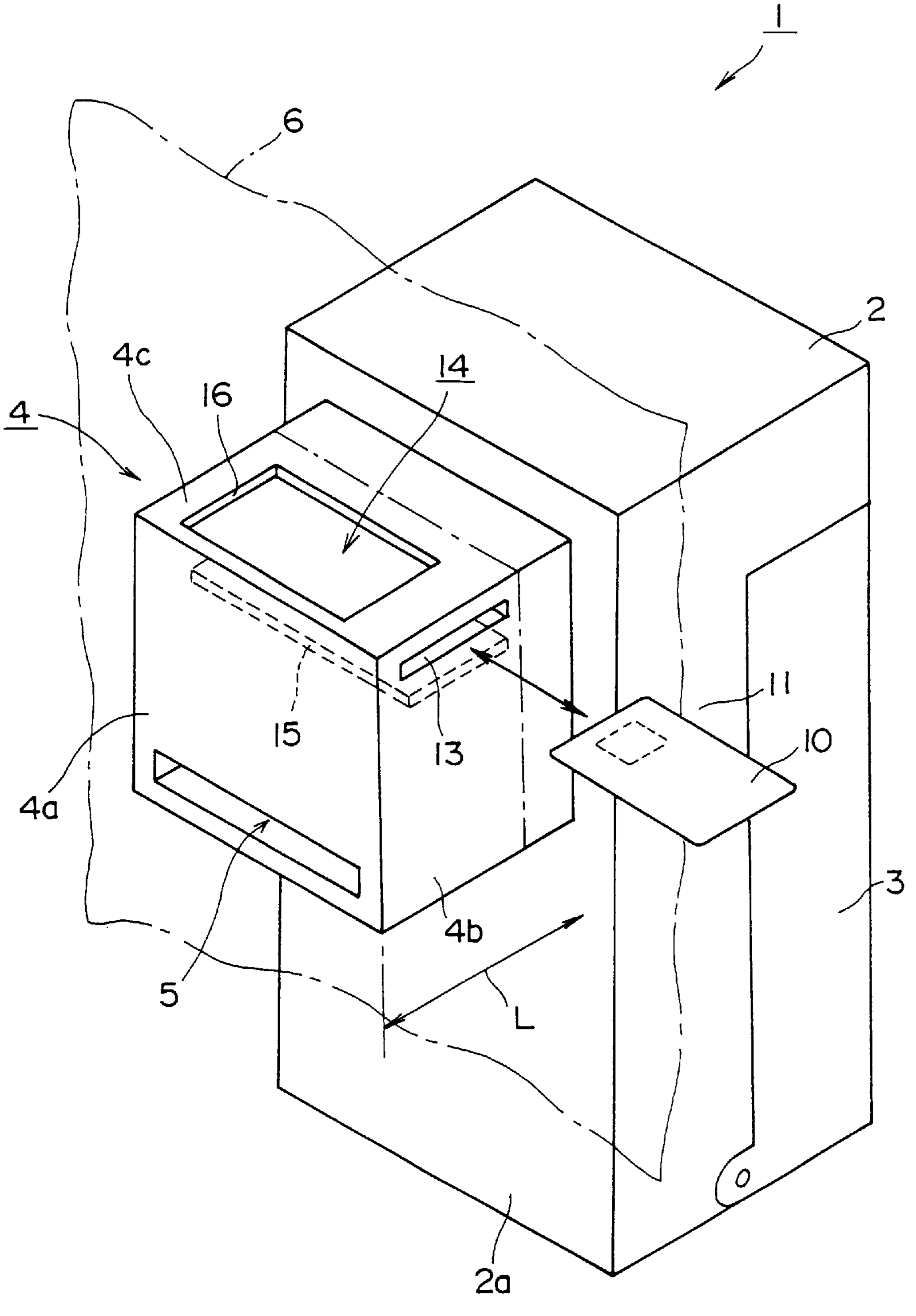
FIG. 4 is a schematic perspective view illustrating another embodiment of the first banknote-processing device with a card reader/writer function.

Moreover, in the above embodiment, as may be seen from FIG. 1, the IC card 10 is moved in a direction which is at right-angles to the direction in which banknotes are inserted, and a vertical posture is retained when it is inserted into the front mask 4. However, the present invention is in no way restricted to the above embodiment, and as illustrated in FIG. 4 where corresponding symbols refer to the same components as in FIG. 1, it is also possible to locate the card holder 14 on the upper surface 4*c* of the front mask 4, so as to allow the IC card 10 to be moved in a direction which is at right-angles to the direction in which banknotes are inserted while retaining a horizontal posture when it is inserted into the front mask 4, and to locate the information access means 15 at the rear thereof. It goes without saying that in this case the window 16 is also formed on the upper surface 4*c* of the front mask 4.

Further, in the above embodiment the IC card 10 has been inserted into the card holder 14 by moving it in a direction which is at right-angles to the direction in which banknotes are inserted. However, the present invention is in no way restricted to the above embodiment, and as illustrated in FIG. 5 where corresponding symbols refer to the same components as in FIG. 1, it is also possible to insert the IC card 10 into the front mask 4 by moving it in the same direction as that in which banknotes are inserted.

In this case, the card insertion slot 13 is formed on the front 4*a* of the front mask 4, the card holder is formed on the upper surface 4*c* of the front mask 4, and the window 16 is also formed on the upper surface 4*c* of the front mask 4.

Figure 5:
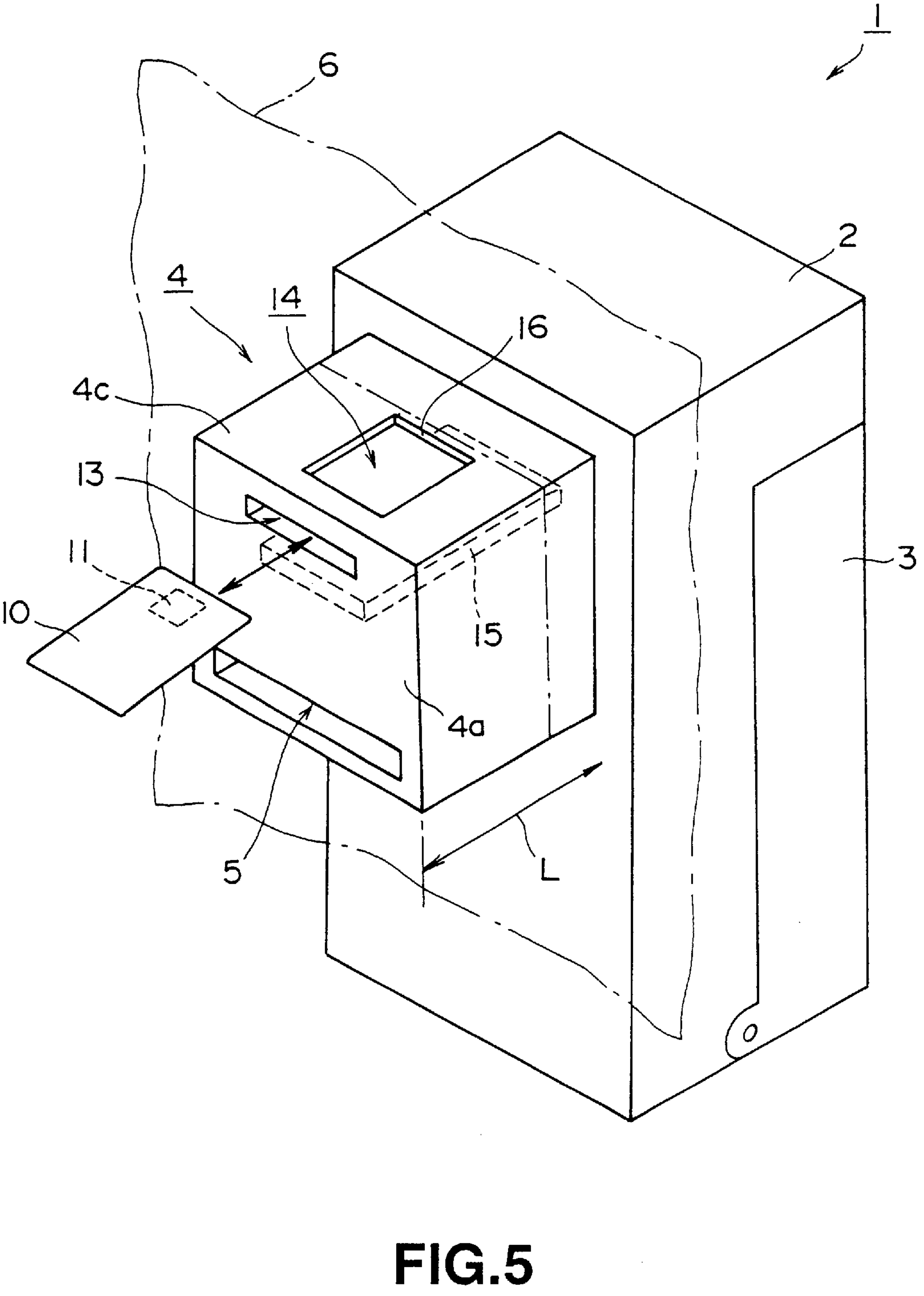
FIG. 5 is a schematic perspective view illustrating still another embodiment of the first banknote-processing device with a card reader/writer function.

It goes without saying that since in the embodiments illustrated in FIGS. 4 and 5 the structure is such that the IC card 10 is inserted into the card holder 4 while retaining a horizontal posture, the length L of the front mask 4 from front to rear is somewhat greater than that of the front mask 4 illustrated in FIG. 1.

The IC card 10 in the above embodiments is of the type which has a coil or similar material serving as an antenna (not depicted in the drawings) and relays information from the IC recording area 11 to the information access means 15 without contact, and the corresponding information access means 15 of the card reader/writer 12 is also of the type which accesses the IC recording area 11 of the IC card 10 without contact by means of an antenna or other means of communication. However, the present invention is in no way restricted to the above embodiment, and may also employ information access means 15 of the card reader/writer 12 of a type which accesses the IC recording area by direct contact. Alternatively it may employ a contact type wherein the IC recording area 11 of the IC card 10 relays information by direct contact corresponding to the access type of the information access means 15 of the card reader/writer 12, or it may employ a type which combines the functions of both the contact and non-contact types.

Figure 6:
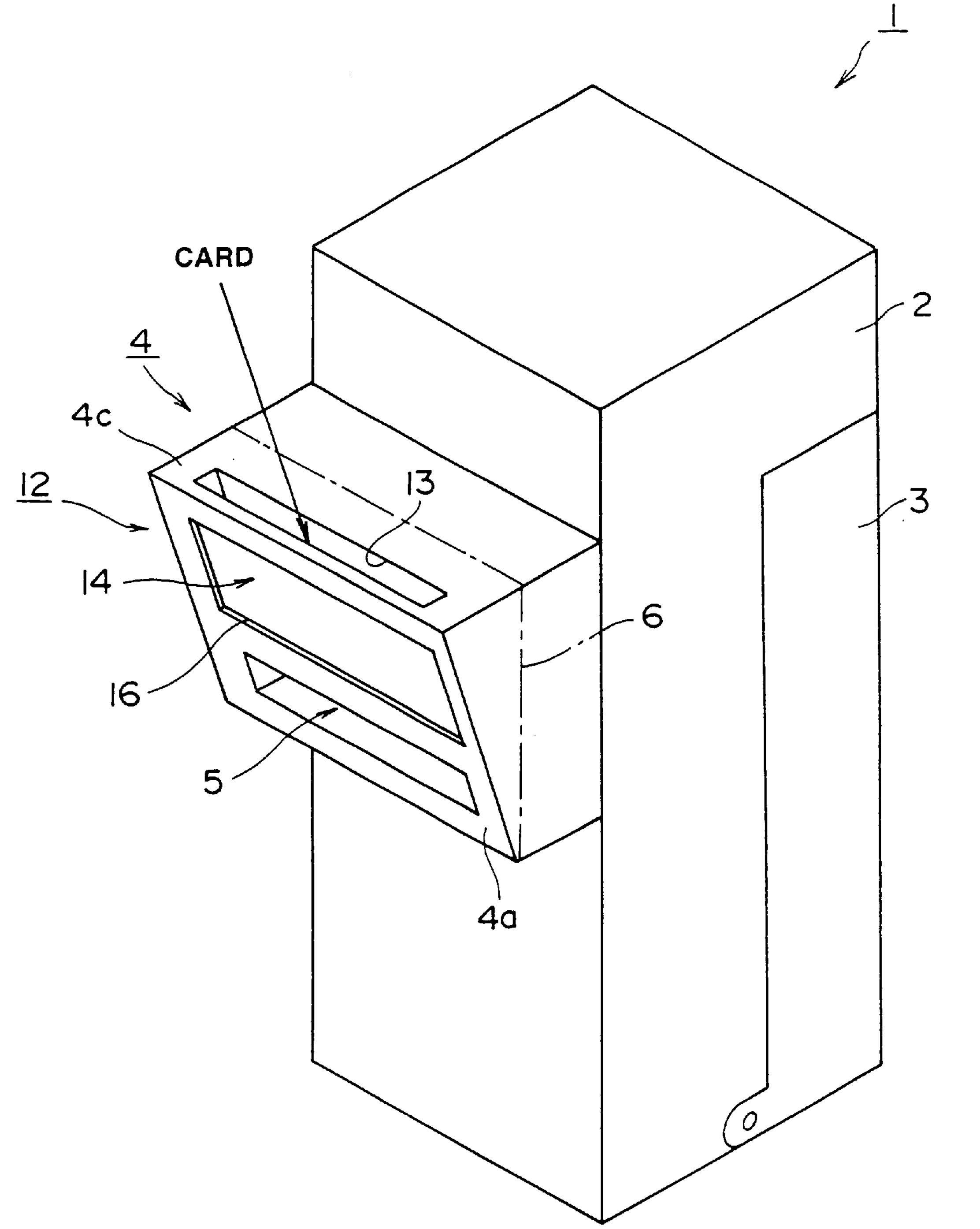
FIG. 6 is a schematic perspective view illustrating yet another embodiment of the first banknote-processing device with a card reader/writer function.

Moreover, the positions in which the card holder 14 and card insertion slot 13 are formed in relation to the front mask 4 are in no way restricted to the above embodiments, and as illustrated in FIG. 6 where corresponding symbols refer to the same components as in FIG. 1, it is also possible for the top end of the front 4*a* of the front mask 4 to be inclined, and for the card holder 14 to be formed on the inclined front 4*a*. It is also possible for the card insertion slot 13 to be formed on the upper surface 4*c* of the front mask 4, and the IC card 10 to be inserted from the side longitudinally towards the upper surface 4*c* of the front mask 4.

Figure 7:
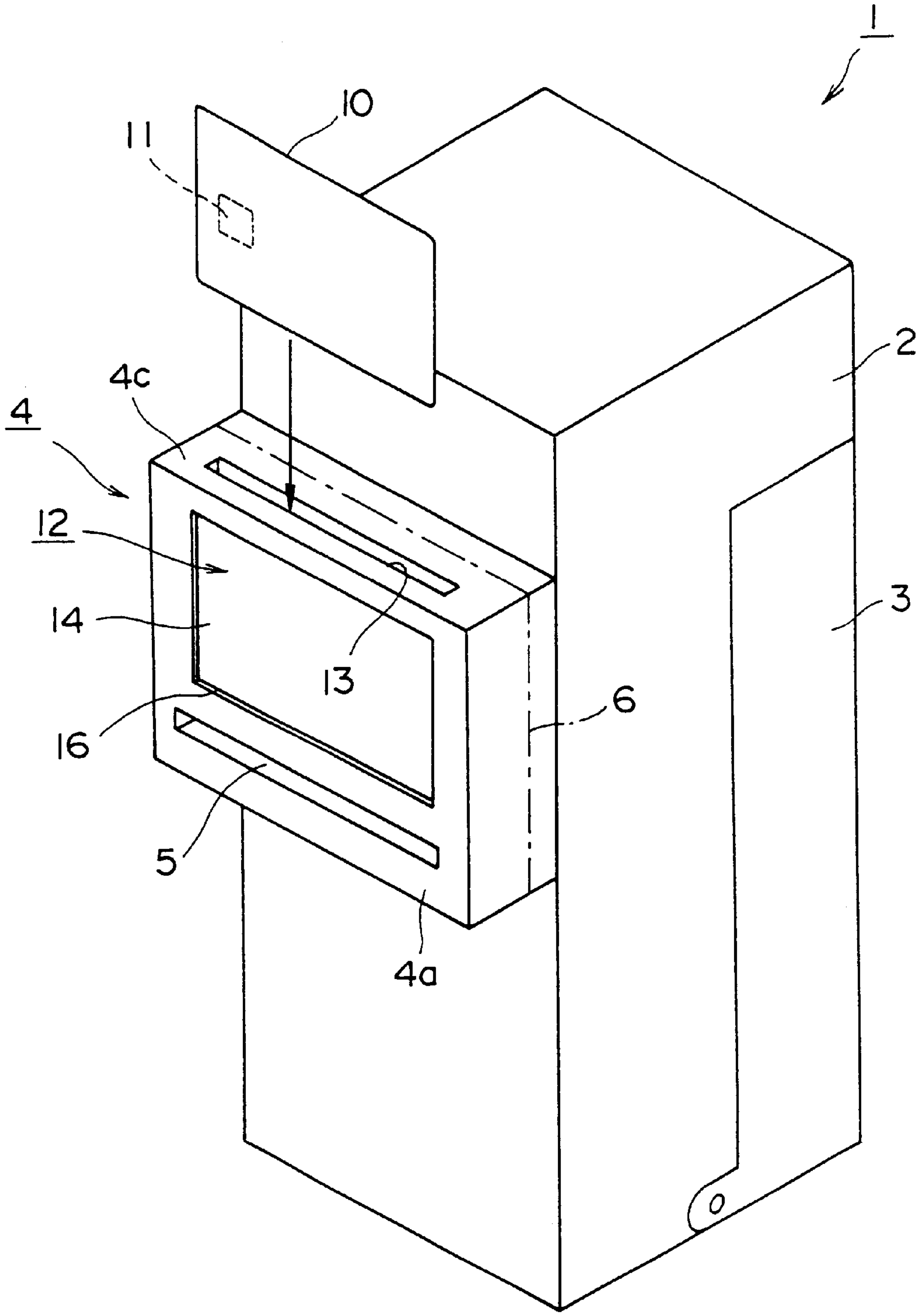
FIG. 7 is a schematic perspective view illustrating a further another embodiment of the first banknote-processing device with a card reader/writer function.

As illustrated in FIG. 7 where corresponding symbols refer to the same components as in FIG. 1, it is also possible for the card insertion slot 13 to be formed on the upper surface 4*c* of the front mask 4, and for the IC card 10 to be inserted from the side longitudinally towards the upper surface 4*c* of the front mask 4.

Figure 8:
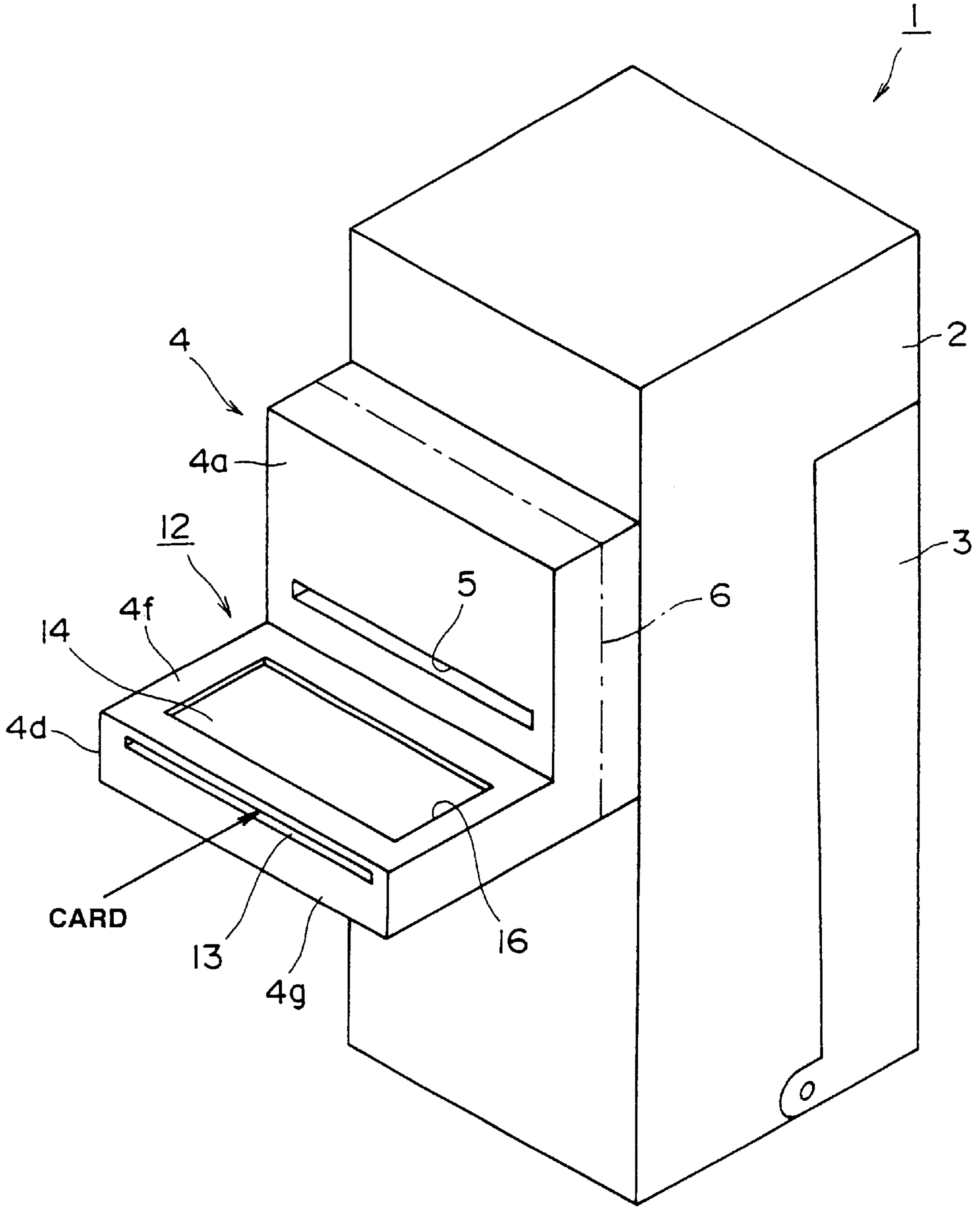
FIG. 8 is a schematic perspective view illustrating a still further embodiment of the first banknote-processing device with a card reader/writer function.

As illustrated in FIG. 8 where corresponding symbols refer to the same components as in FIG. 1, it is also possible for the bottom part of the front 4*a* of the front mask 4 to project, and for the card holder 14 to be formed on the upper surface 4*f* of the projecting part 4*d*, in which case the card insertion slot 13 can be formed on the front 4*g* of the projecting part 4*d* and for the IC card 10 to be inserted longitudinally from the front 4*g* of the projecting part 4*d*.

Figure 9:
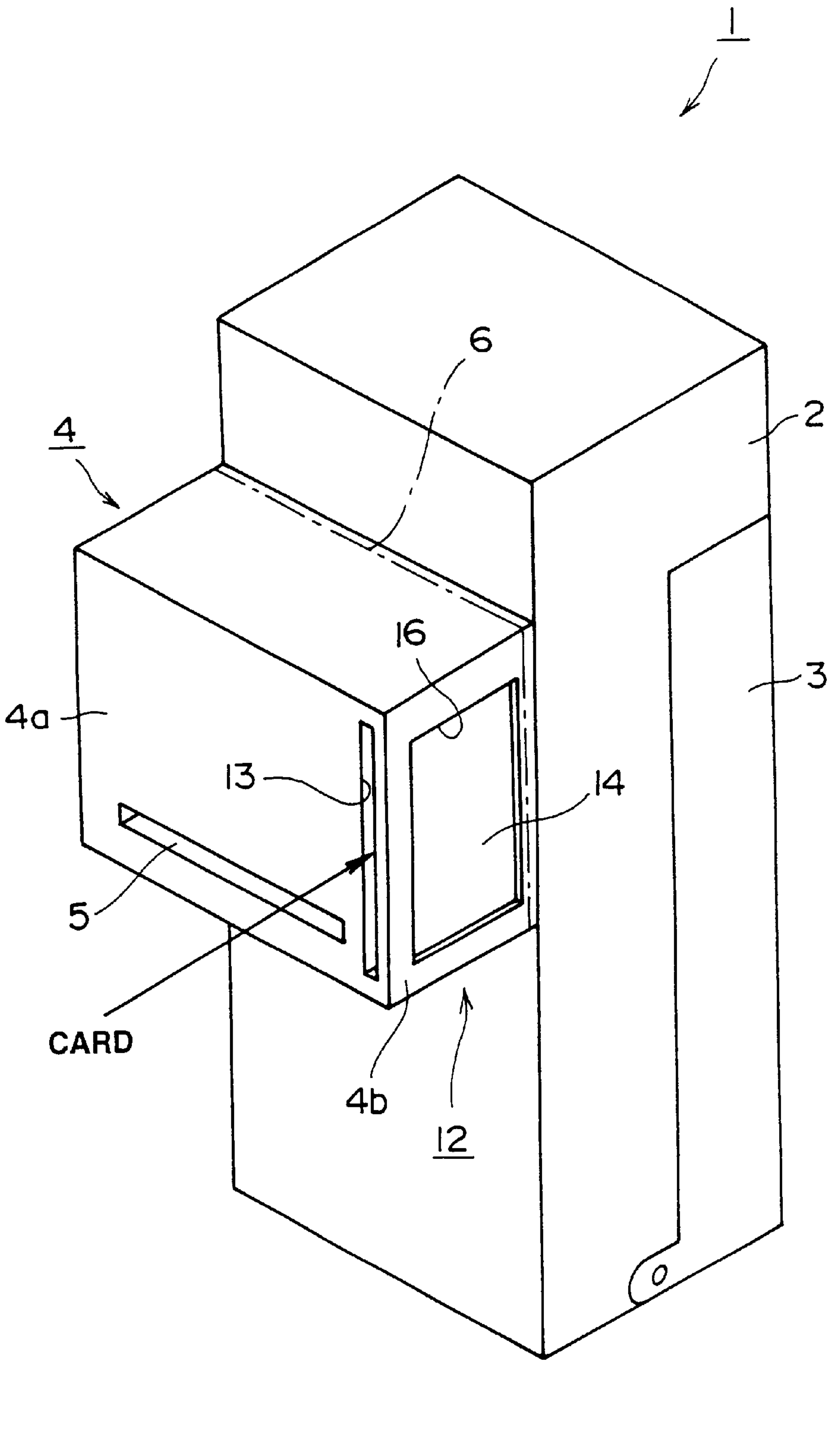
FIG. 9 is a schematic perspective view illustrating yet further embodiment of the first banknote-processing device with a card reader/writer function.

As illustrated in FIG. 9 where corresponding symbols refer to the same components as in FIG. 1, it is also possible to form the card holder 14 on the side 4*b* of the front mask 4, and the card insertion slot 13 on the front 4*a* of the front mask 4, in which case the IC card 10 is inserted longitudinally from the front 4*a* of the front mask 4.

As has been explained above, in the foregoing first banknote-processing device with a card reader/writer function a card reader/writer for the purpose of recording and reproducing information to and from the IC recording area of an IC card is provided within the front mask, thus rendering it unnecessary to reserve extra space to fit the card reader/writer in the automatic vending or self-service machine in which the banknote-processing device is installed. This in turn means that it is possible to fit a card reader/writer without adding to the restrictions of space within the self-service machine. Moreover, installing the card reader/writer within the front mask in which the banknote insertion slot is formed makes it possible to provide a banknote-processing device with a card reader/writer function cheaply and without involving major alterations to conventional banknote-processing devices, by replacing the conventional front mask in which only a banknote insertion slot is formed with one which also has a card reader/writer. What is more, fitting the card reader/writer within the front mask allows damaging signal interference between the card reader/writer and the banknote identification unit of the banknote-processing device to be eliminated as far as is feasible.

There follows a detailed description of the second banknote-processing device with a card reader/writer function to which the present invention pertains.

Figure 10:
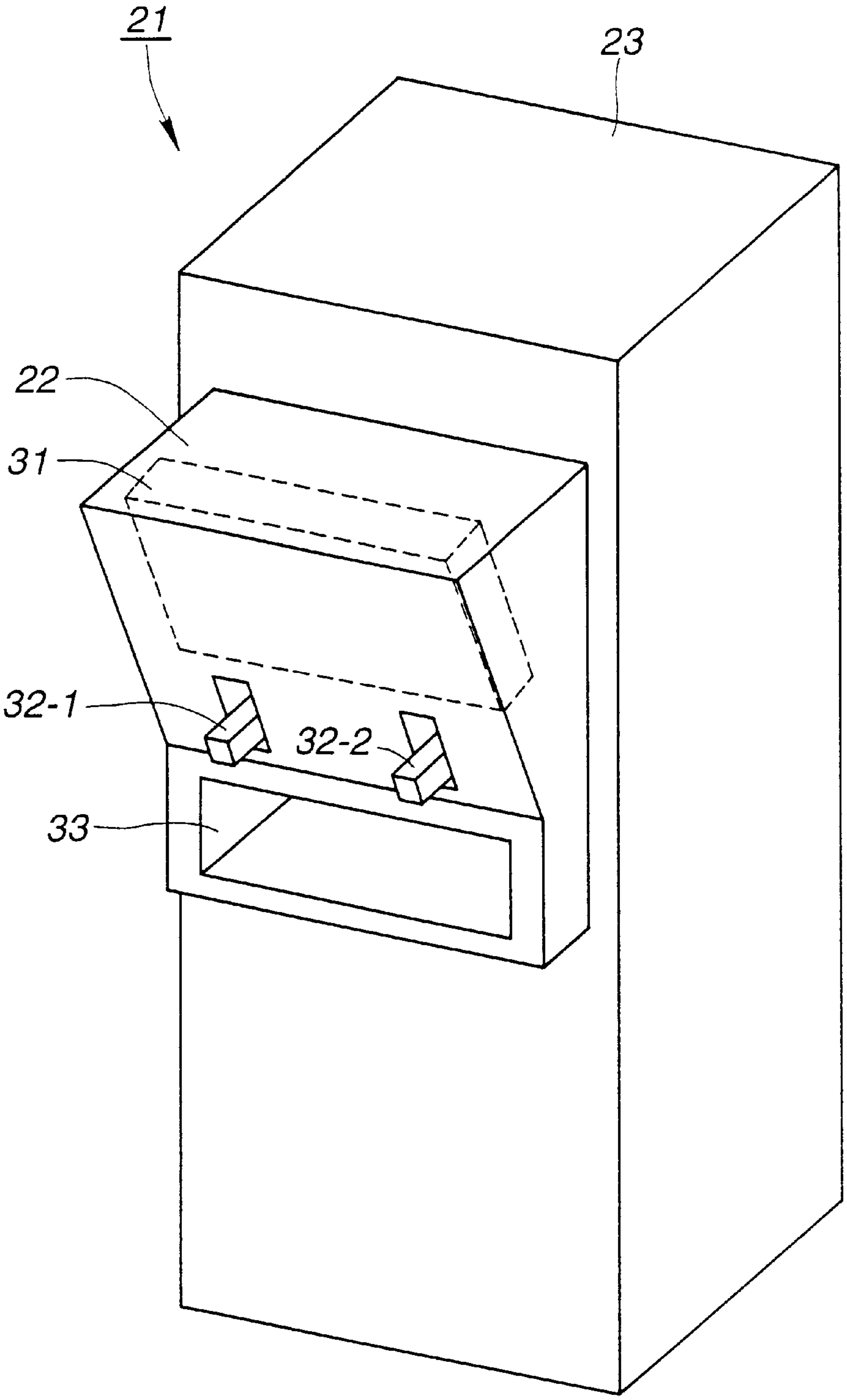
FIG. 10 is a schematic perspective view of the second banknote-processing device with a card reader/writer function to which the present invention pertains.
Figure 11:
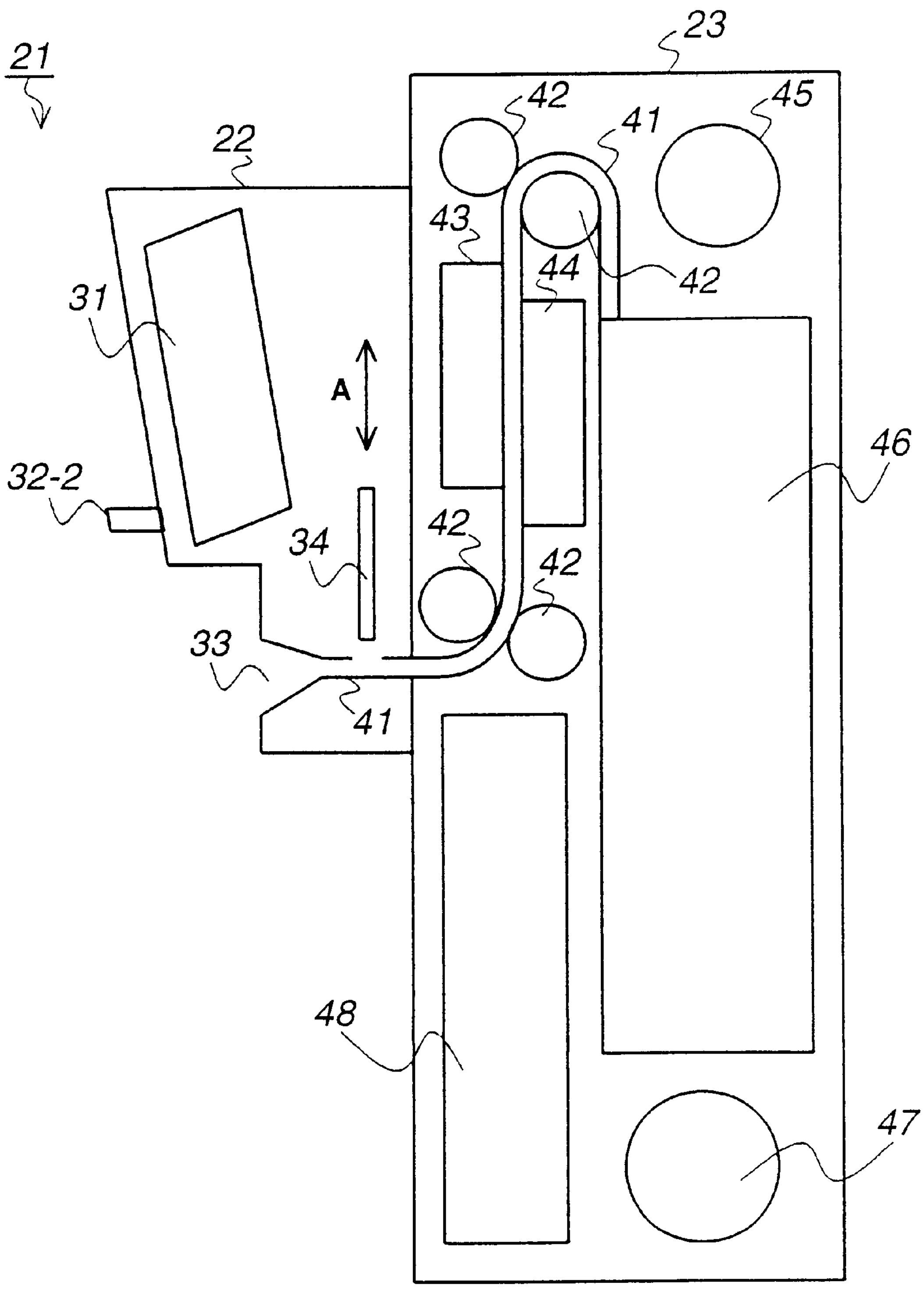
FIG. 11 is schematic cross-sectional view of the second banknote-processing device with a card reader/writer function to which the present invention pertains.

FIG. 10 is a schematic perspective view of the second banknote-processing device with a card reader/writer function to which the present invention pertains, and FIG. 11 is schematic cross-sectional view.

In FIGS. 10 and 11, the banknote-processing device 21 comprises a front mask 22 and a body 23. The front mask 22 is equipped with stoppers 32-1 and 32-2 for the purpose of supporting on the one hand an antenna 31 which communicates with a non-contact type IC card and on the other hand the IC card, a banknote insertion slot 33 for inserting banknotes, and a shutter 34 which operates in the direction of the arrow A in the drawings in order to prevent the removal of banknotes once inserted. The body 23 is equipped with a transport passage 41 and transport rollers 42 which help to transport banknotes, a magnetic sensor 43 and photosensor 44 which serve to identify authentic and counterfeit banknotes, and determine the denominations of the authentic banknotes, a banknote transport motor 45 which serves to drive the banknote transport rollers 42, a stacker 46 which stores those banknotes which have been determined to be authentic, a stacker motor 47 for driving the stacker, and a control unit 48 which controls the whole banknote-processing device 21.

When a banknote is inserted into the banknote-processing device 21 through the banknote insertion slot 33, it is transported along the transport passage with the aid of the transport rollers 42. The detection output of the magnetic sensor 43 and photosensor 44 identify it as authentic or counterfeit, and determine its denomination if it is authentic. If the banknote is found to be authentic and of a correct denomination (if there are restrictions on the denominations accepted), it is stored in the stacker 46.

Meanwhile, if the banknote-processing device 21 is to record and reproduce information on denominations and the like to and from an IC card (not depicted in the drawings), communication is implemented between the IC card supported with the aid of the card holder mentioned below and the stoppers 32-1, 32-2 on the one hand and the antenna 31 on the other.

The control unit 48 serves to control both the acceptance of banknotes and communication with the IC card, and information concerning both of these is communicated to and from the control unit of the automatic vending machine (not depicted in the drawings).

Here the control unit 48 is located within the banknote-processing device 21, but the control unit 48 is not restricted to this location, and may be located elsewhere in the automatic vending machine.

There follows a description of the card holder referred to above.

The card holder, whereby the banknote-processing device 21 supports the IC card during recording and reproduction, is fitted in the automatic vending machine to which the banknote-processing device 21 is attached, and is located in the front mask cover 54 which covers the front mask 22.

The front mask cover 54 serves to cover the front mask 22, and in it are located as necessary the banknote insertion slot 33 and its cover, along with the display which shows how much money has been inserted and other items. It is fixed on to an aperture formed on the front of the automatic vending machine. In the embodiment, the front mask cover 54 is constructed of plastic or a similar synthetic resin.

Figure 12:
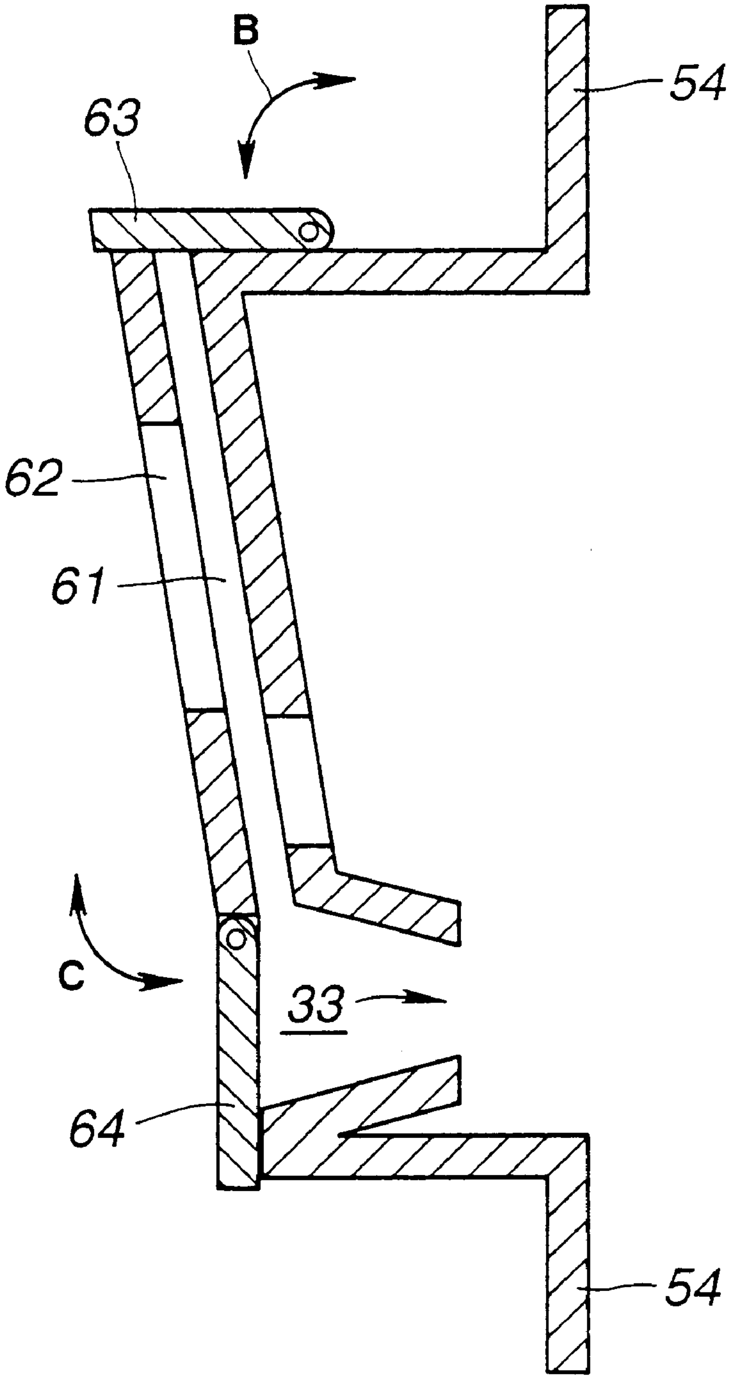
FIG. 12 is a schematic cross-sectional view of the front mask cover with a card holder.

FIG. 12 is a schematic cross-sectional view of the front mask cover 54 with a card holder.

In FIG. 12, the front mask cover 54 comprises a card holder 61 for the purpose of supporting the IC card, a window 62 for the purpose of confirming the presence or absence of an IC card within the card holder 61, a card holder cover 63 which opens and closes in the direction of the arrow B and serves to prevent soiling within the card holder 61, and a banknote insertion slot cover 64 which opens and closes in the direction of the arrow C and serves to prevent soiling of the banknote insertion slot 33.

The card holder 61 supports the IC card along with the abovementioned stoppers 32-1, 32-2 of the banknote-processing device when the front mask cover 54 is fixed to the automatic vending machine. It does not need a base, and is constructed with an open bottom so that dirt will not accumulate inside it.

For the same reason, the window 62 is made of transparent glass or resin, but this can be omitted where the relevant automatic vending machine is located indoors, and there is no need for a card holder cover either.

Figure 13:
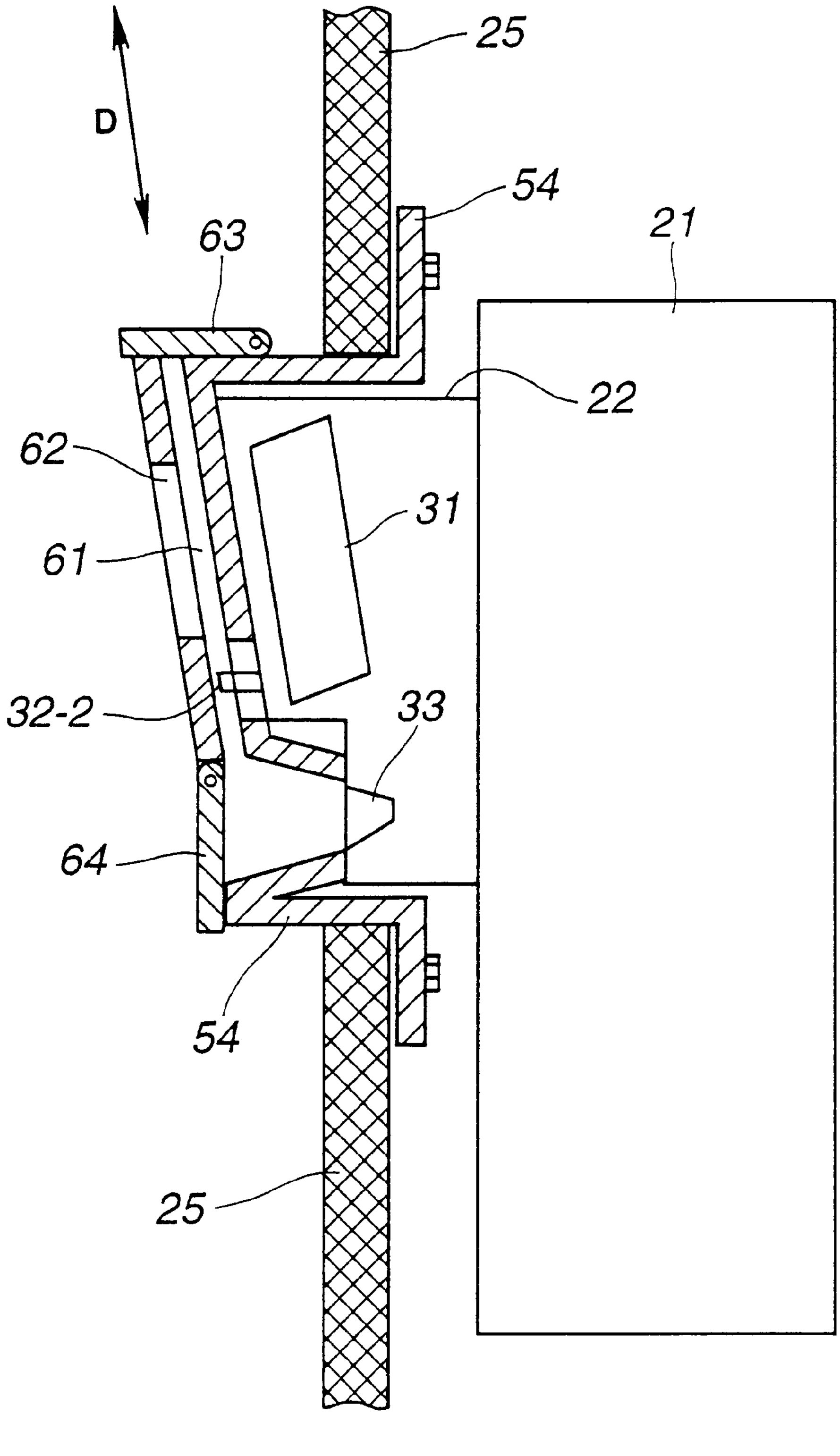
FIG. 13 is a schematic cross-sectional view of an automatic vending machine with front mask cover fixed on the front, and with a banknote-processing device fitted in addition.
Figure 14:
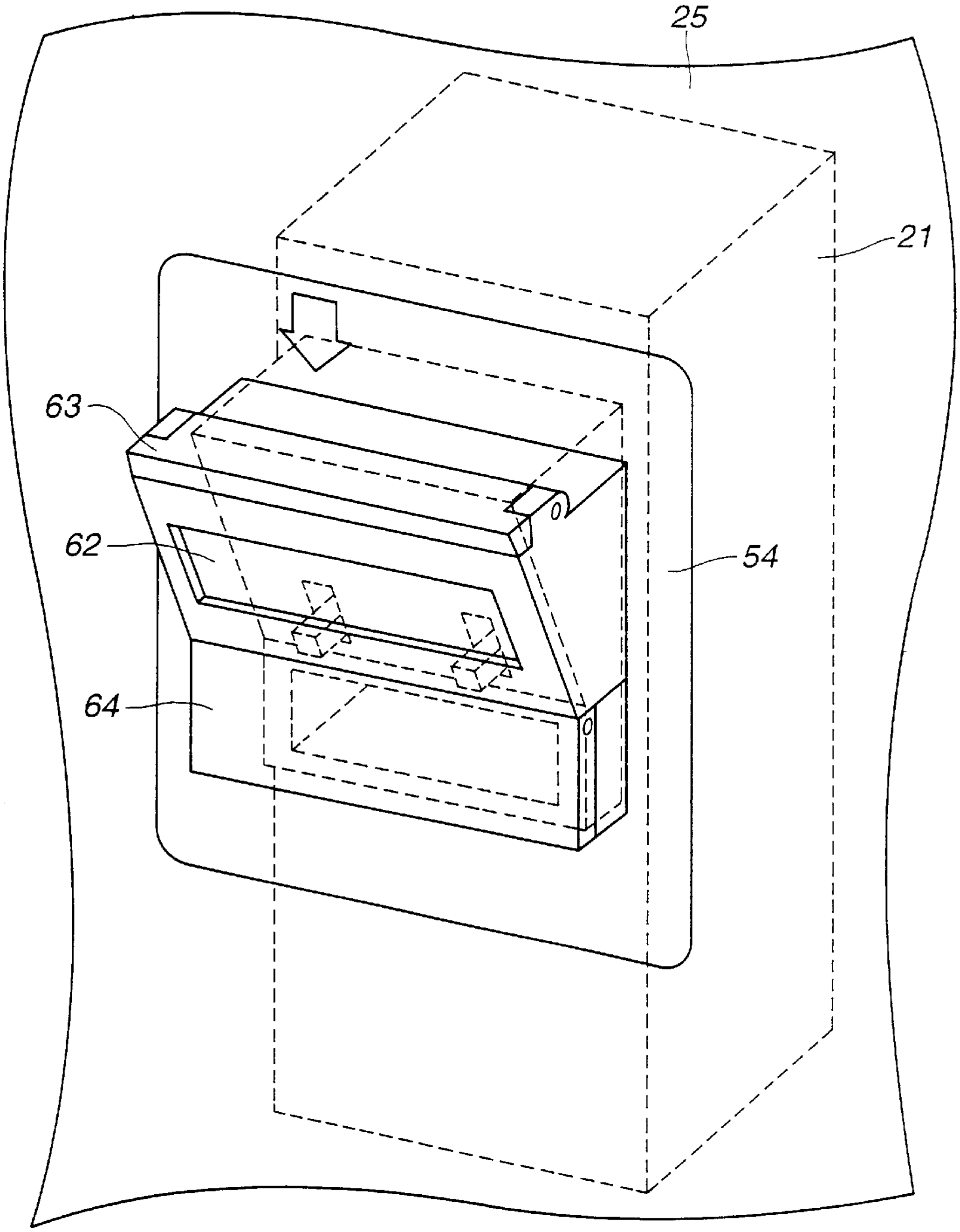
FIG. 14 is a perspective view of an automatic vending machine with front mask cover fixed on the front, and with a banknote-processing device fitted in addition.

FIG. 13 is a schematic cross-sectional view of an automatic vending machine with a front mask cover 54 fixed on the front door 25, and with the front mask 22 of a banknote-processing device 21 also fitted within the front mask cover 54. FIG. 14 is a perspective view the same.

As may be seen from these drawings, the front mask cover 54 is fixed to the front door 25 of an automatic vending machine. When the banknote-processing device 21 is fitted, as FIG. 13 shows, the positions of the card holder 61 and antenna 31 correspond to each other. The card is inserted into and removed from the card holder 61 in the direction denoted by the arrow D in FIG. 13, but if the direction of the arrow D is vertical, it becomes difficult to insert and remove the card on account of the spatial relationship with the front door 25. Even where no difficulty arises, it is easier to insert and remove the card if a prescribed incline is adhered to, and for this reason the front mask cover 54 (card holder 61) and banknote-processing device 21 (front mask 22) are inclined at a prescribed angle. It should be added that there is no adverse effect on the non-contact recording and reproduction of the IC card even if the two angles are not exactly the same.

The IC card is inserted into the card holder 61 from the top after first opening the card holder cover 63.

When the IC card is inserted, the card holder 61 supports it along with the stoppers 32-1, 32-2, the stoppers acting also as sensors to detect the insertion of the IC card. (In the present embodiment the stoppers 32-1, 32-2 act as sensors, but it is also possible to provide a separate sensor.)

When the stoppers 32-1, 32-2 detect the insertion of the IC card, the control unit 48 (FIG. 11) operates, allowing monetary and other information to be recorded and reproduced to and from the IC card by way of the antenna 31. Once the transaction (purchase of the product) is complete, the control unit 48 operates the stoppers 32-1, 32-2 to eject the IC card from the card holder 61. Actuators are employed to cause the stoppers 32-1, 32-2 to act in this manner, but it is also possible to construct the stoppers 32-1, 32-2 in such a manner as to facilitate the same action with the aid of springs or similar elastic bodies, thus simplifying the structure.

Figure 15A:
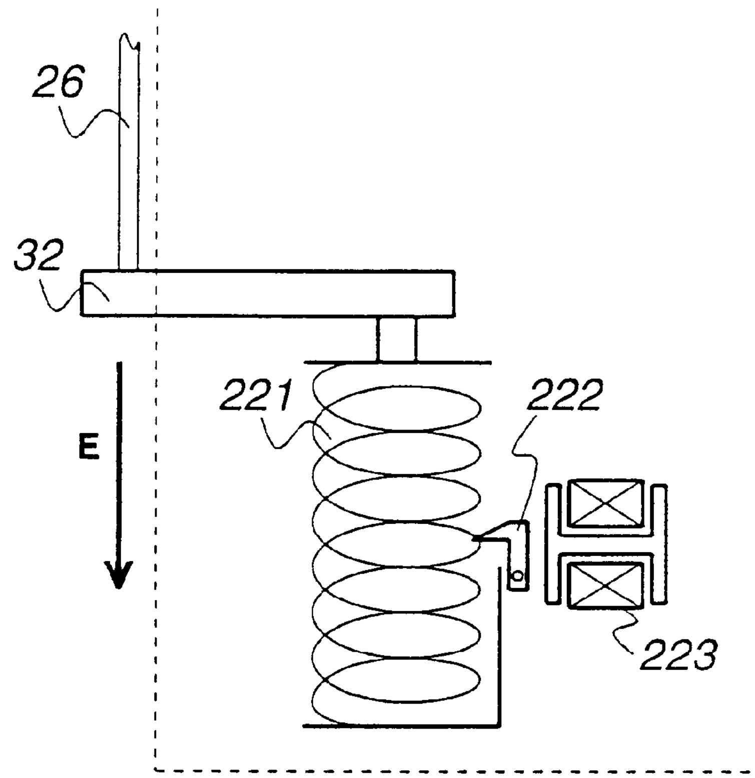
FIGS. 15(*a*) and 15(*b*) are schematic drawings of the structure of a stopper using a spring.

FIGS. 15(*a*) and 15(*b*) are schematic drawings of the structure of a stopper 32-1, 32-2 using a spring.

If the stopper 32-1, 32-2 is constructed using a spring, the spring 221 supports the stopper 32-1, 32-2 as illustrated in FIG. 15(*a*). When the user inserts the IC card 26 into the card holder 61, the force applied by the user causes the stopper 32-1, 32-2 to move along with the IC card 26 in the direction denoted by the arrow E in the drawing.

Figure 15B:
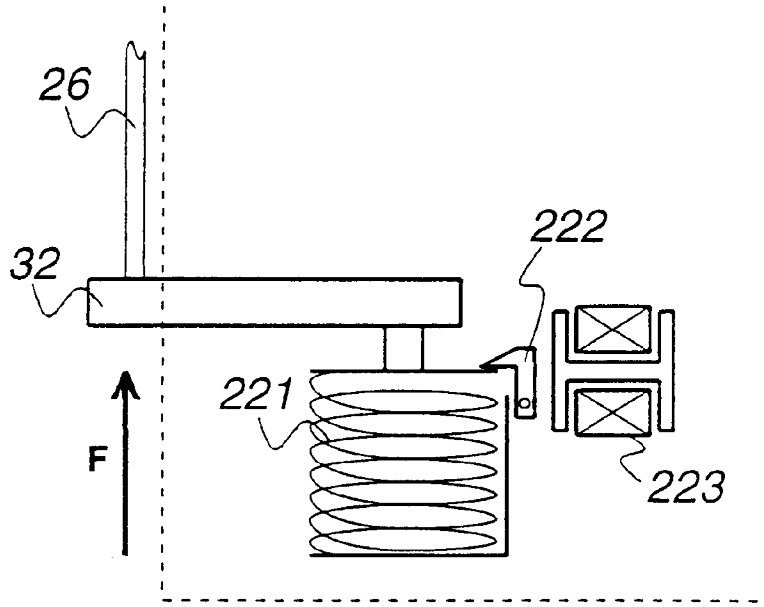

When the stopper 32-1, 32-2 and the IC card 26 have moved to the designated position, the spring 221 becomes compressed and the stopper 32-1, 32-2 is held in position by a hook 222 as illustrated in FIG. 15(b).

Once recording and reproduction to and from the IC card 26 are complete, the control unit 48 passes an electric current to the coil 223. As a result of this, the hook 222, which is made of iron or a similar magnetic body, is attracted by the coil 223, the spring 221 is released, and the stopper 32-1, 32-2 moves in the direction of the arrow F in the drawing to allow the IC card 26 to be ejected from the card holder 61.

Now the action of the control unit 48 from the insertion of the IC card to the ejection thereof will be described with reference to FIG. 16.

Figure 16:
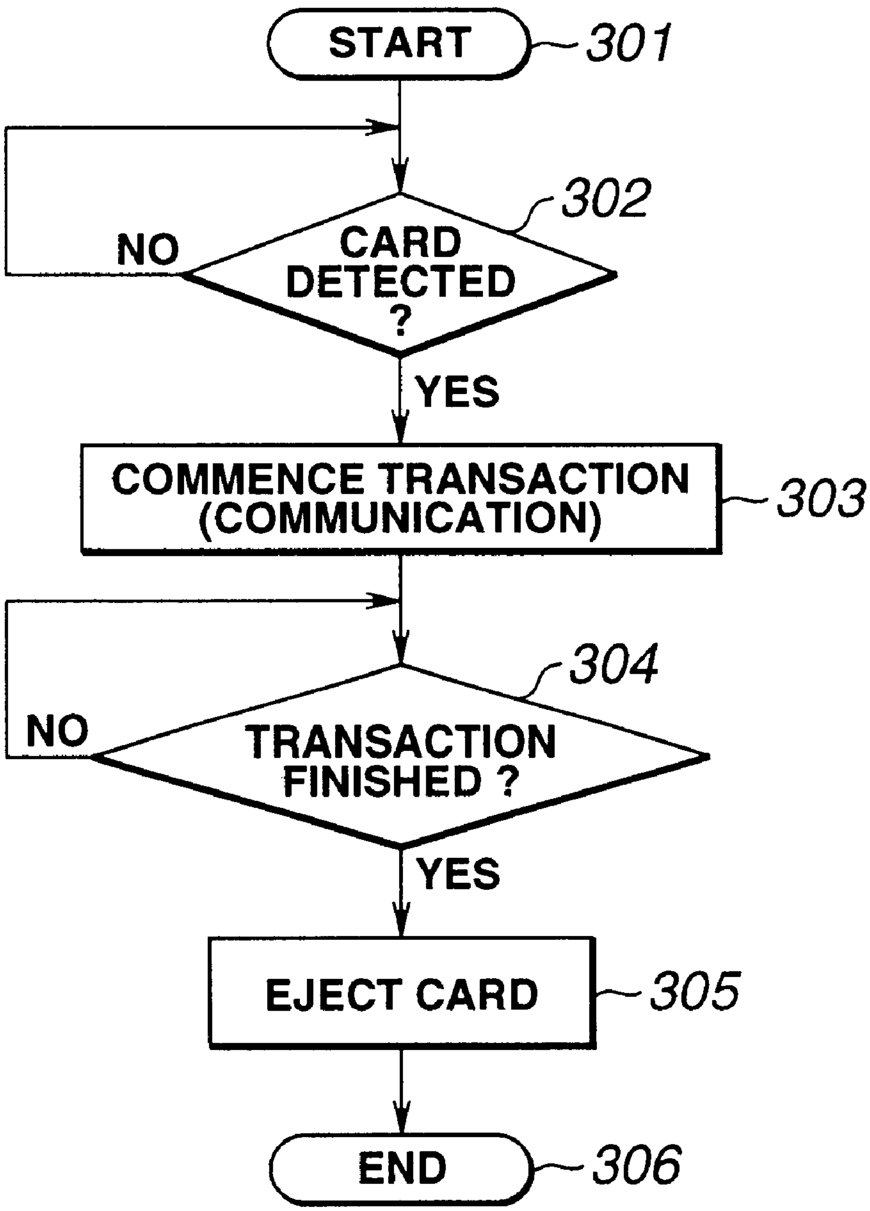
FIG. 16 is a flowchart illustrating the action of the control unit.

FIG. 16 is a flowchart illustrating the action of the control unit 48.

When the electric current is introduced and action initiated (step 301), the stopper 32-1, 32-2, which also acts as a sensor to detect the presence or absence of a card in the card holder 61, enters stand-by mode until such time as a card is detected (NO at step 302). When a card is detected by the stopper 32-1, 32-2 (YES at step 302), a transaction (communication) with the IC card within the card holder 61 is initiated by way of the antenna 31 (step 303). When the transaction is complete (YES at step 304), an electric current is passed to the coil 223, the card is ejected from the card holder 61 (step 305), and the processing is complete (step 306).

In the above embodiment the card has been inserted and removed in a vertical direction, but it is also possible to move the IC card 26 in a direction which is at right-angles to the direction in which banknotes are inserted, and to insert the IC card 26 at a slight angle from the vertical.

Figure 17:
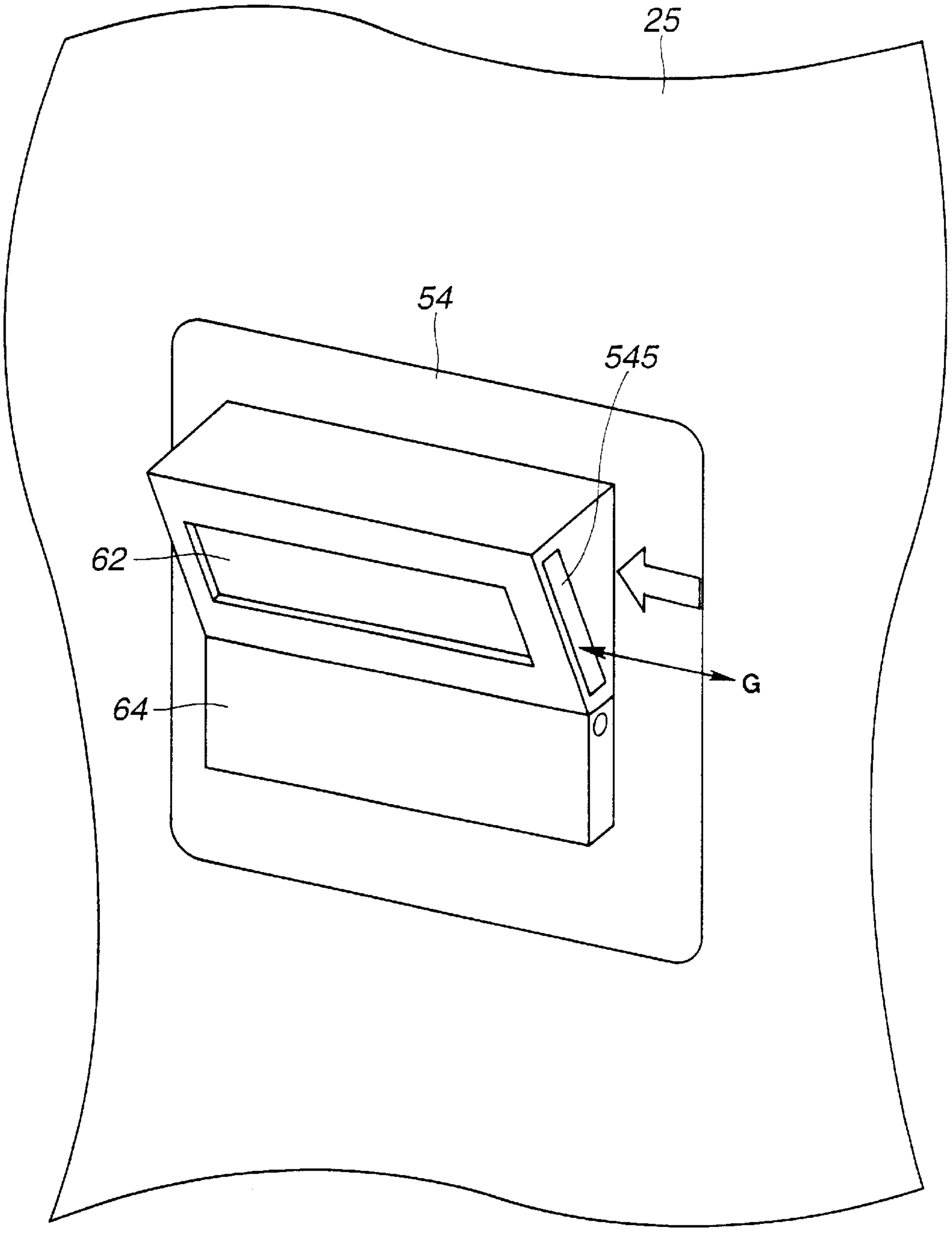
FIG. 17 is a perspective view where the card in inserted and removed in a horizontal direction.

FIG. 17 is a perspective view where the card is inserted and removed in a direction which is at right-angles to the direction in which banknotes are inserted, and corresponds to FIG. 14.

In FIG. 17, the front mask cover 54 which is fixed on the front door 25 of the automatic vending machine is provided with a card insertion slot 545 for the purpose of inserting and removing the IC card in the direction denoted by the arrow G in the drawing. There is no cover on the card insertion slot 545, but a window 62 and banknote insertion slot 64 are provided as in the above embodiment.

If the front mask cover 54 is adopted, the stopper on the banknote-processing device (not depicted in the drawing) must correspond to the direction denoted by the arrow G, but otherwise the structure can be the same.

In the above embodiment, stoppers are driven in order to eject the card, but if the card insertion slot is made large enough to accept the fingers of a human hand or the window is left open, it is also possible to fix the position of the stoppers (which may be provided either on the banknote-processing device side or on the card holder side) and allow the user to eject the card himself.

In the above embodiment, the front mask 22 has been provided with an antenna 31 for the purpose of communication with the IC card, but it goes without saying that in the case of a banknote-processing device of the type which has no front mask, the antenna 31 may be located within the body 23 of the device.

The second banknote-processing device with a card reader/writer function described above is structured in such a manner that the banknote-processing device fitted to the automatic vending machine is provided with an antenna for the purpose of communication with the IC card, while the front mask cover also fitted to the automatic vending machine is equipped with a card holder. This means that not only is there no need to reserve extra space within the automatic vending machine for the card reader/writer, but it is possible to implement transactions using an IC card without any need for a special opening for the card insertion slot to be formed in the front of the automatic vending machine. Moreover, the fact that the mechanism for ejecting the IC card from within the card holder is located on the banknote-processing device side means there is no need for an electric current to be passed to the front mask cover. Thus, the use of IC cards is enabled simply by replacing the conventional front mask used on an automatic vending machine with one for the banknote-processing device and changing the software as required.

What is more, the use of a non-contact type of IC card means that there is no restriction on the shape of the front mask or the front mask cover, which not only permits improvements in the design of automatic vending machines, but also makes it possible, even in the case of machines for outdoor use, to provide the card holder with an insertion slot cover and a window for the purpose of checking that the card has been removed.

There follows a detailed description of the third banknote-processing device with a card reader/writer function to which the present invention pertains.

Figure 18:
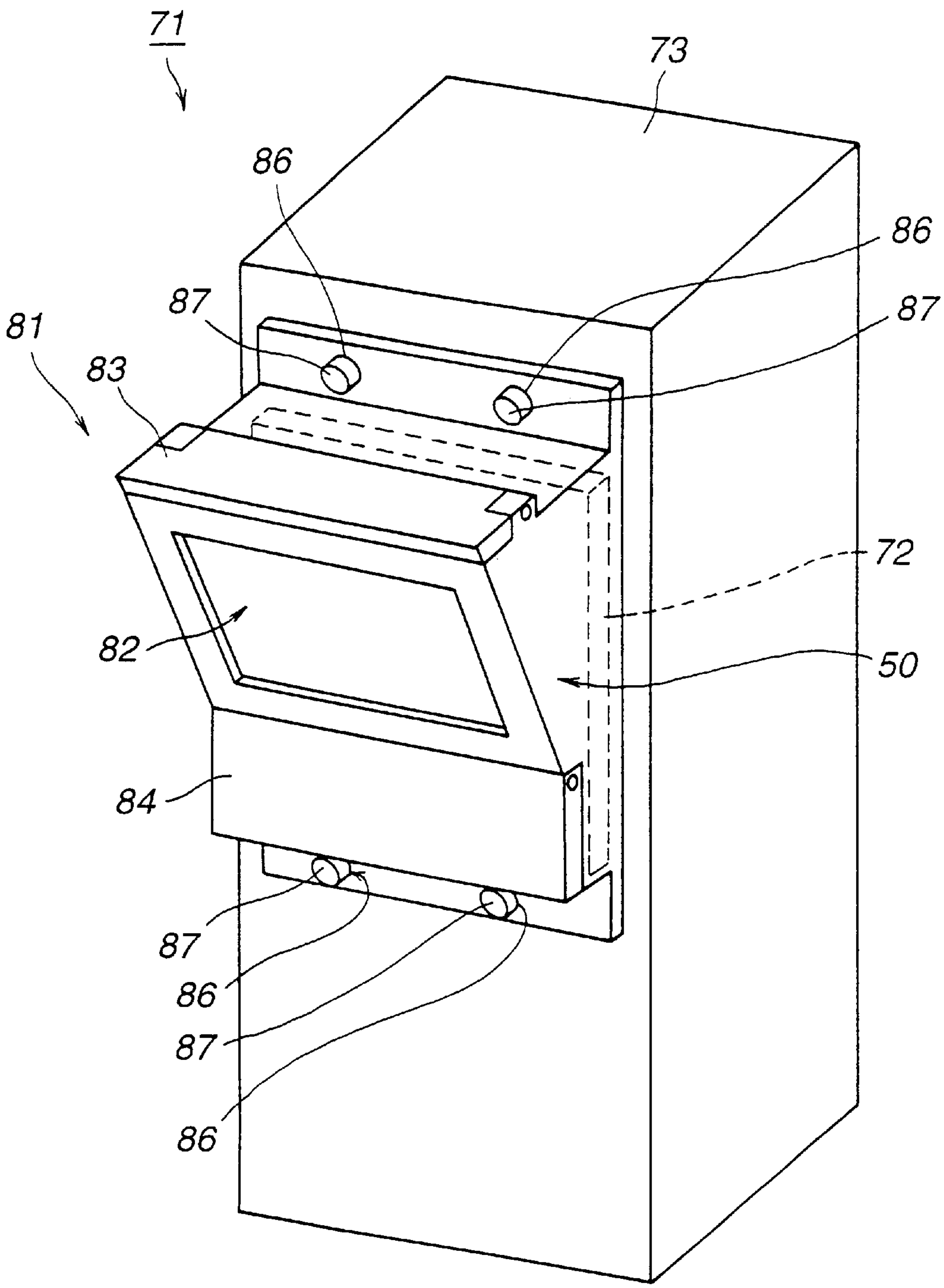
FIG. 18 is a schematic perspective view of the third banknote-processing device with a card reader/writer function to which the present invention pertains.

FIG. 18 is a schematic perspective view of the third banknote-processing device with a card reader/writer function 71 to which the present invention pertains;

The banknote-processing device 71 comprises a body 73 having a front mask 72 in which is formed a banknote insertion slot (not depicted in the drawing) as with conventional devices, and a front mask cover 81 fitted to the body 73 of the device and covering the front mask 72.

Figure 19:
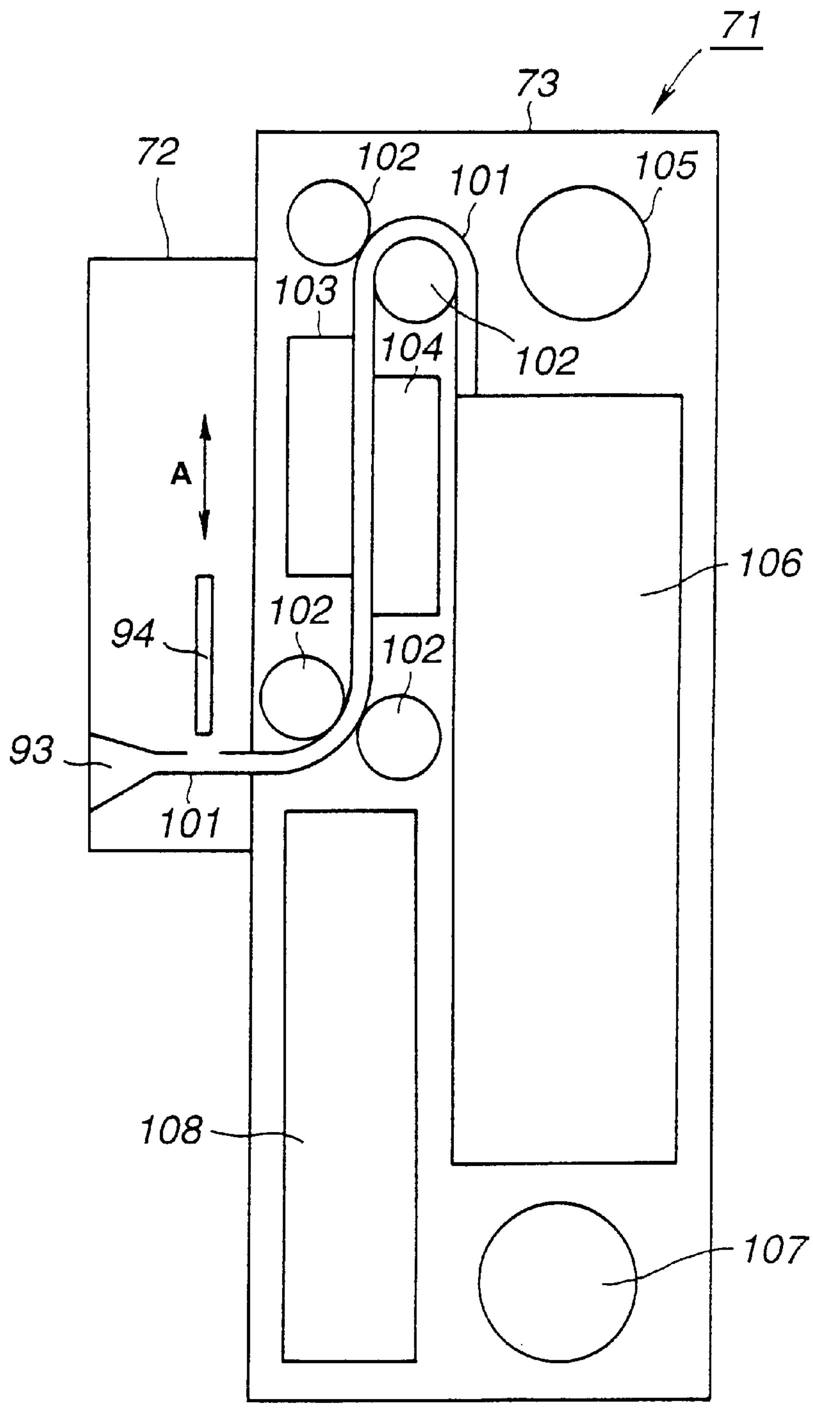
FIG. 19 is a schematic perspective view of the third banknote-processing device which constitutes part of the third banknote-processing device with a card reader/writer function to which the present invention pertains.

In other words, as may be seen from the schematic perspective view of a conventional banknote-processing device illustrated in FIG. 19, the front mask 72 has formed on the front thereof a banknote insertion slot 93 for the purpose of inserting banknotes, and is provided internally with a shutter 94 which is driven in the direction of the arrow A in the drawing and serves to prevent banknotes from being removed once inserted. The front mask 72 is fitted to the front of the body 73 of the device in such a manner as to be capable of being attached and detached freely.

Meanwhile, within the body 73 of the device are located a transport passage 101 and transport rollers 102 for the purpose of transporting banknotes, a magnetic sensor 103 and photosensor 104 which serve to identify authentic and counterfeit banknotes, and determine the denominations of the authentic banknotes, a banknote transport motor 105 which serves to drive the banknote transport rollers 102, a stacker 106 which stores those banknotes which have been determined to be authentic, a stacker motor 107 for driving the stacker, and a control unit 108 which controls the whole banknote-processing device 71.

On the front of body 73 of the device is formed an aperture (not depicted in the drawing) for the purpose of attaching and detaching the front mask cover described below.

Figure 20:
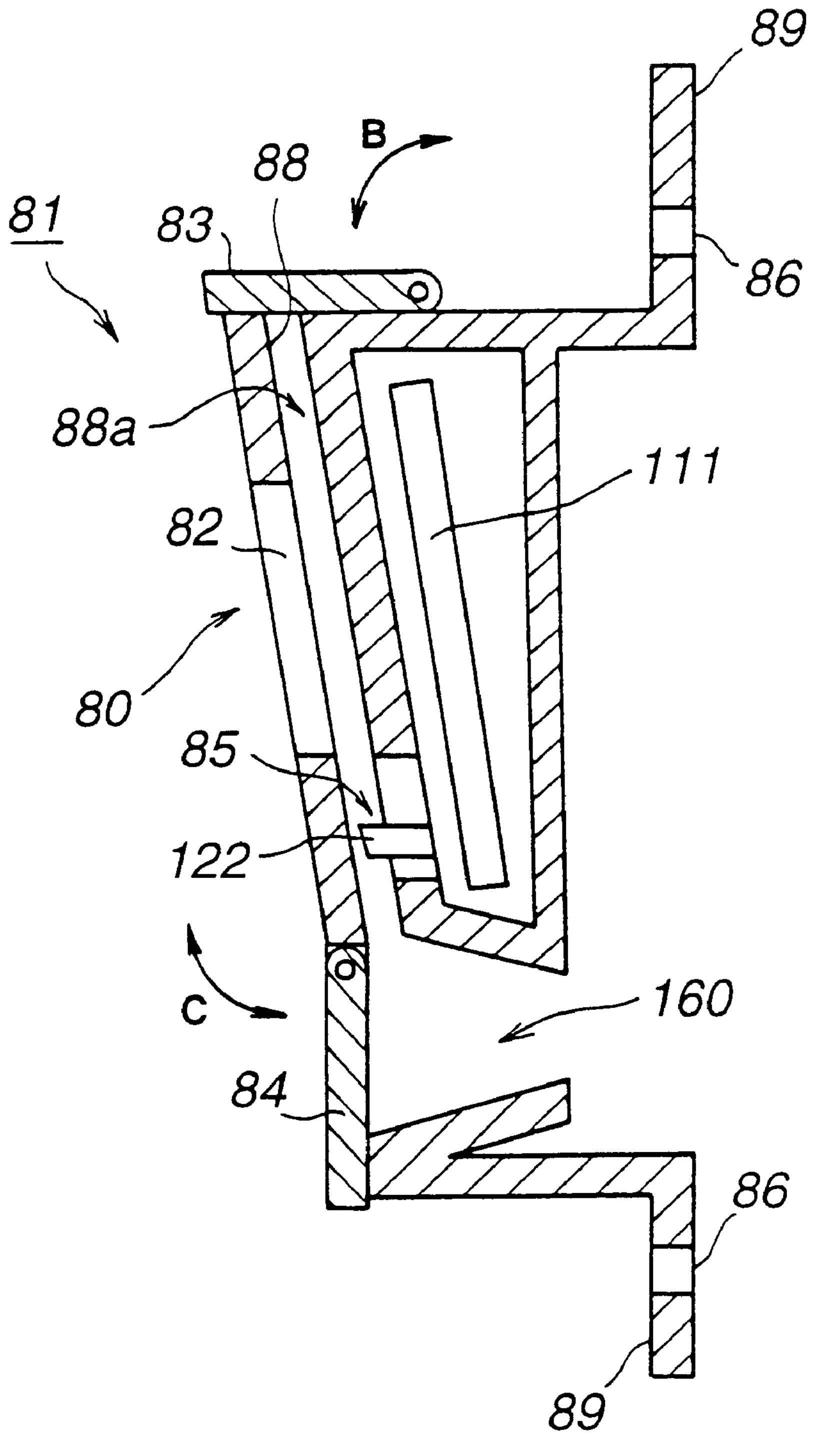
FIG. 20 is a schematic cross-sectional view of a front mask cover.

As may be seen from FIG. 20, the front mask cover 81 covers the front mask 72 in such a manner as to be capable of being attached and detached freely, and comprises an antenna 111 for the purpose of communicating with the non-contact type IC card (not depicted in the drawing), and a card holder 80, which is formed in a position opposing to the antenna 111 and serves to support and store the IC card (not depicted in the drawing).

The antenna 111 and card holder 80 are formed in such a manner as to be inclined each at a prescribed angle to the body 73 of the device (FIG. 19). It should be added that the antenna 111 and card holder 80 constitute the card reader/writer which records and reproduces information to and from the IC recording area of the IC card.

Of these, the antenna 111 is located within the front mask cover 81 in a position opposing to the card holder 80. The card holder 80 comprises a card insertion slot 88 formed in the upper part thereof, a pair of stoppers 122 whereof the heading edges protrude into a card housing slit 88*a* connected to the card insertion slot 88 and serving to support longitudinally an IC card inserted through the card insertion slot 88, a window 82 formed slightly above the stoppers 122, a card insertion slot cover 83 which covers the card insertion slot 88, a banknote insertion slot cover 84 serving to cover the section 160 which connects to the banknote insertion slot 93 (FIG. 19), a hole 85 formed by connecting the lower edge of the card housing slit 88*a* to the section 160 which connects to the banknote insertion slot 93 in order to prevent the accumulation of dust, and a pair of holes 86 formed in upper and lower tongues 86.

The pair of stoppers 122 not only support the IC card inserted into the card housing slit 88*a,* but also function as sensors to detect the insertion of the IC card. (In the present embodiment the stoppers 122 act as sensors, but it is also possible to provide a separate sensor.)

The window 82 is formed in order to facilitate confirmation of the presence or absence of an IC card, and is made of transparent glass or resin in order to prevent the infiltration of dust and other foreign bodies.

Where the automatic vending machine to which the banknote-processing device 71 is fitted is to be located indoors, the glass or resin may be omitted from the window 82, and there is no need for a card insertion slot cover 83 or banknote insertion slot cover 84 either.

The card insertion slot cover 83 rotates freely in the direction denoted by the arrow B, and serves to prevent the infiltration of dust and other foreign bodies into the card holder 88.

Similarly, the banknote insertion slot cover 84 is located in such a manner as to cover the banknote insertion slot 93 (FIG. 19) of the front mask 72. It rotates freely in the direction denoted by the arrow C, and serves to prevent the infiltration of dust and other foreign bodies into the banknote insertion slot 93.

Meanwhile, the purpose of the hole 85 is to prevent the accumulation of dust inside the card holder 80.

With a front mask cover 81 of this sort, insertion of an IC card into the card holder 80 involves opening the card insertion slot cover 83 and inserting the IC card into the card housing slit 88*a.*

Once the IC card is inserted, the pair of stoppers 122 not only support it, but also act as sensors to detect its insertion.

When the insertion of an IC card is detected by the stoppers 122, the control unit 103 (FIG. 19) operates, allowing monetary and other information to be recorded and reproduced to and from the IC card by way of the antenna 111.

Once the transaction (purchase of the product) is complete, the control unit 103 operates the stoppers 122 to eject the IC card from the card holder 80. Actuators are employed to cause the stoppers 122 to act in this manner, but it is also possible to construct the stoppers 122 in such a manner as to facilitate the same action with the aid of springs or similar elastic bodies, thus simplifying the structure.

Figure 23A:
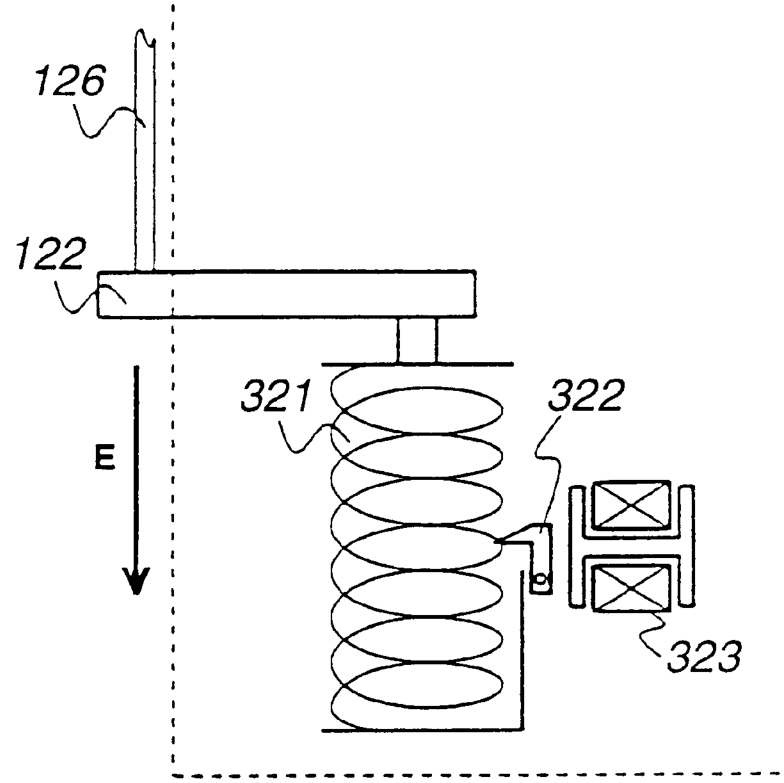
FIGS. 23(*a*) and 23(*b*) are schematic drawings of the structure of a stopper using a spring.
Figure 23B:
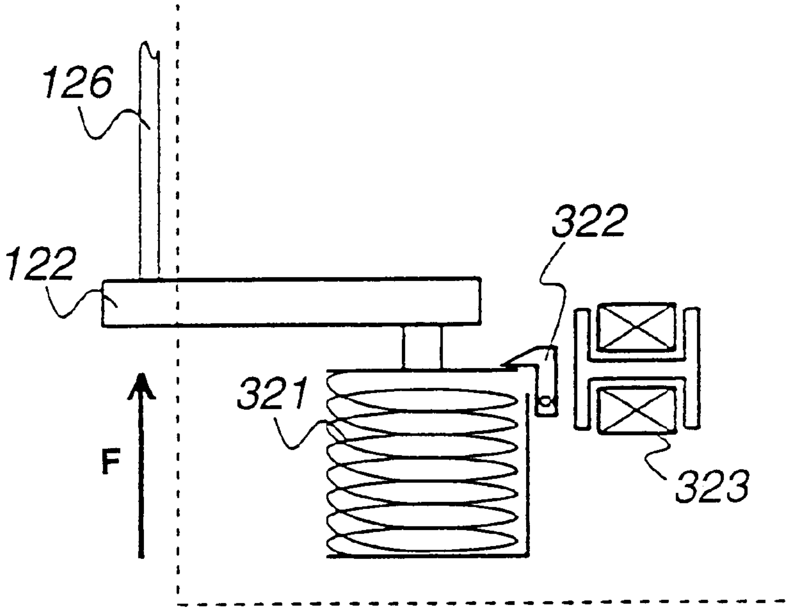

FIGS. 23(*a*) and 23(*b*) are schematic drawings of the structure of a stopper 122 using a spring.

If the stopper 122 is constructed using a spring, the spring 321 supports the stopper 122 as illustrated in FIG. 23(*a*). When the user inserts the IC card 56 into the card holder 80, the force applied by the user causes the stopper 42 to move along with the IC card 126 in the direction denoted by the arrow E in the drawing.

When the stopper 122 and the IC card 126 have moved to the designated position, the spring 321 becomes compressed and the stopper 122 engages with and is held in position by a hook 322 as illustrated in FIG. 23(*b*). Once recording and reproduction to and from the IC card 126 are complete, the control unit 108 passes an electric current to the coil 323. As a result of this, the hook 322, which is made of iron or a similar magnetic body, is attracted by the coil 323, and the engagement between the stopper 122 and the hook 322 is released. As a result, the stopper 122 moves in the direction of the arrow F in the drawing to allow the IC card 126 to be ejected from the card holder 80.

Figure 21:
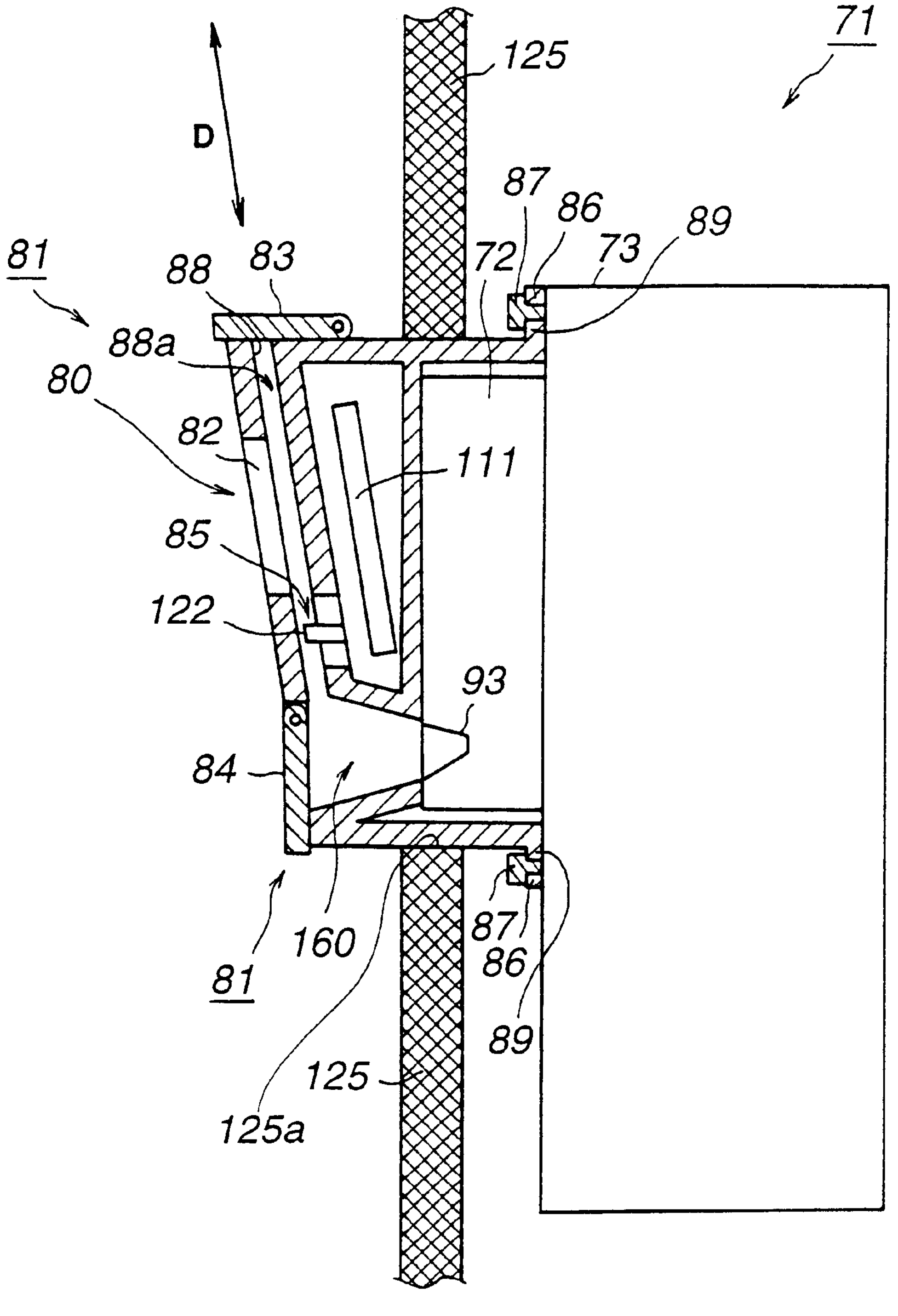
FIG. 21 is a schematic cross-sectional view showing the third banknote-processing the third banknote-processing device with a card reader/writer function as fitted to an automatic vending machine.

With the front mask cover 81, the card is inserted into and removed from the card holder 80 in the direction denoted by the arrow D in FIG. 21. The fact that the card holder 60 and the antenna 111 are inclined at a prescribed angle to the body 73 of the device makes it easier to insert and remove the card than it would be if the direction of the arrow D were vertical. It should be added that there is no adverse effect on the non-contact recording and reproduction of the IC card even if the two angles are not exactly the same.

In order to assemble the banknote-processing device 71, a front mask cover 81 of the above structure and a conventional banknote-processing device are prepared. The front mask 72 fixed to the body 73 of the device is covered with the front mask cover 81 as illustrated in FIG. 21, and holes (not depicted in the drawing) formed in the body 73 of the device for the purpose of attaching and detaching the front mask cover are aligned with holes 86 in the front mask cover 81. It then becomes possible to attach the front mask cover 81 to the body 73 of the device by inserting the screws 87 into the holes 86 and screwing it to the body 73 of the device so as to cover the front mask 72.

The banknote-processing device 71 assembled in this manner can revert to a conventional banknote-processing device if the screws 87 are removed and the front mask cover 81 is detached from the body 73 of the device.

Figure 22:
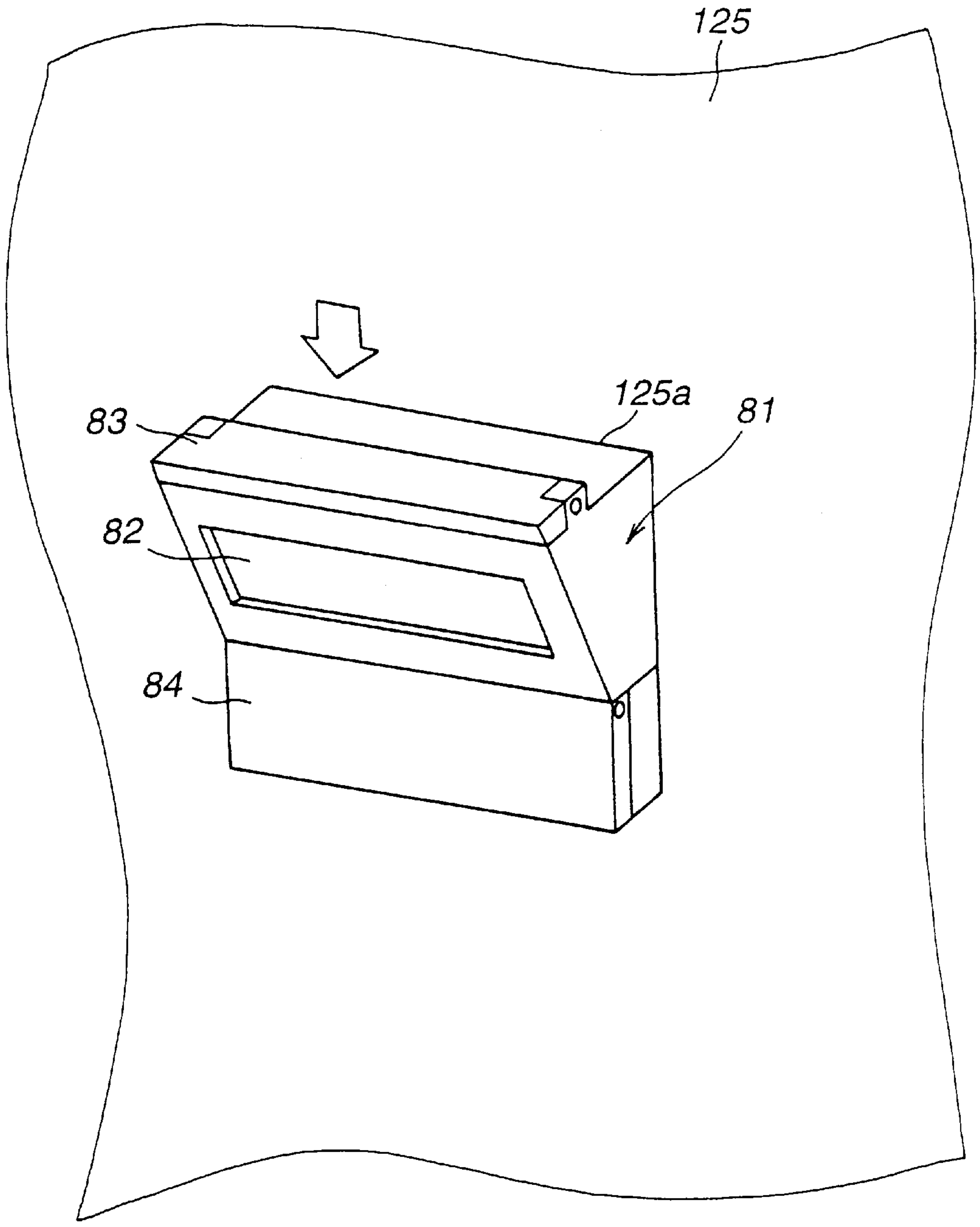
FIG. 22 is a schematic perspective view showing the third banknote-processing the third banknote-processing device with a card reader/writer function as fitted to an automatic vending machine.

Meanwhile, the banknote-processing device 71 assembled in this manner can be attached to an automatic vending machine by allowing the front mask cover 81 to project through a hole 125*a* formed in the front door of the automatic vending machine, as illustrated in FIGS. 21 and 22. This is exactly the same as with a conventional banknote-processing device.

When a banknote is inserted into the banknote-processing device 71 through the front mask cover 81 into the banknote insertion slot 93 illustrated in FIG. 19, it is transported along the transport passage 101 with the aid of the transport rollers 102. At such a time, the detection output of the magnetic sensor 108 and photosensor 104 identify it as authentic or counterfeit, and determine its denomination if it is authentic. If the banknote is found to be authentic and of a correct denomination (if there are restrictions on the denominations accepted), it is stored in the stacker 106.

Meanwhile, if the banknote-processing device 71 is to record and reproduce information on denominations and the like to and from an IC card (not depicted in the drawings), communication is implemented between the IC card supported with the aid of the card holder 80 and the pair of stoppers 122 on the one hand and the antenna 111 on the other.

In other words, the banknote-processing device 71 to which the present invention pertains makes it possible to convert a conventional banknote-processing device into one with an IC card reader/writer simply by attaching the front mask cover 81. Similarly, if the front mask cover 81 is removed, the banknote-processing device 71 to which the present invention pertains reverts to a conventional banknote-processing device without any IC card reader/writer.

Moreover, when the third banknote-processing device with a card reader/writer function 71 to which the present invention pertains is attached to an automatic vending machine, there is no need for any modification whatsoever on the automatic vending machine side.

The banknote-processing device 1 is such that not only can the front mask cover 81 which covers the front mask 72 be freely attached to and detached from the body 73 of the device, but the front mask cover 81 is equipped with a card reader/writer function which records and reproduces information to and from the IC recording area of an IC card. This means that not only is there no need to reserve extra space within the automatic vending machine for the card reader/writer, but it is possible to attach a card reader/writer without imposing any restrictions of internal space in a self-service machine.

Now the action of the control unit 108 from the insertion of the IC card into the banknote-processing device to which the present invention pertains to the ejection thereof will be described with reference to FIG. 24.

Figure 24:
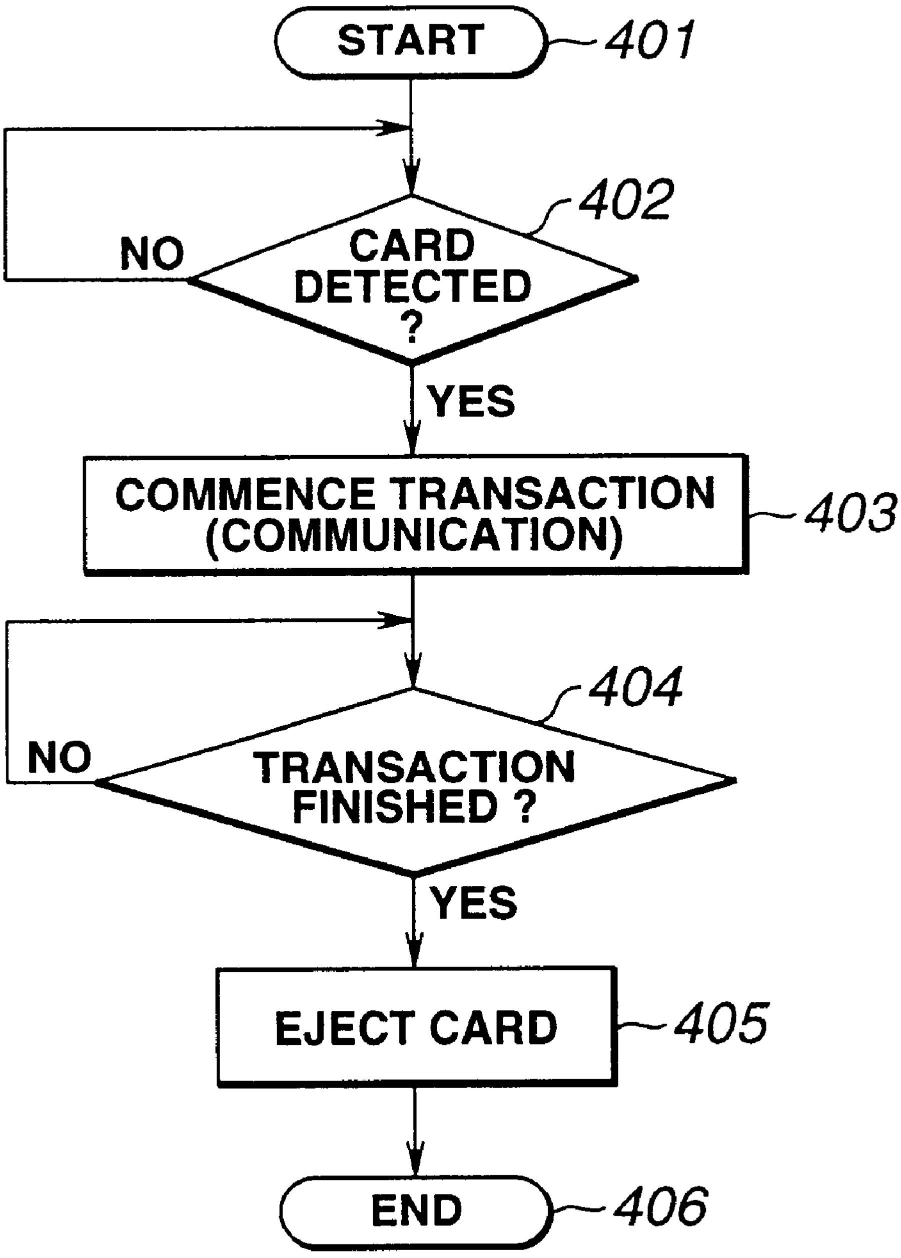
FIG. 24 is a flowchart illustrating the action of the control unit.

FIG. 24 is a flowchart illustrating the action of the control unit 108.

With the control unit 108, when the electric current is introduced and action initiated (step 401), the stopper 122, which also acts as a sensor to detect the presence or absence of a card in the card holder 80, enters stand-by mode until such time as a card is detected (NO at step 402). When a card is detected by the stopper 122 (YES at step 402), a transaction (communication) with the IC card within the card holder 80 is initiated by way of the antenna 111 (step 403).

When the transaction is complete (YES at step 404), an electric current is passed to the coil 323, the card is ejected from the card holder 80 (step 405), and the processing is complete (step 406).

In the above embodiment the card has been inserted and removed in a vertical direction, but this can also be effected in a direction which is at right-angles to the direction in which banknotes are inserted.

Figure 25:
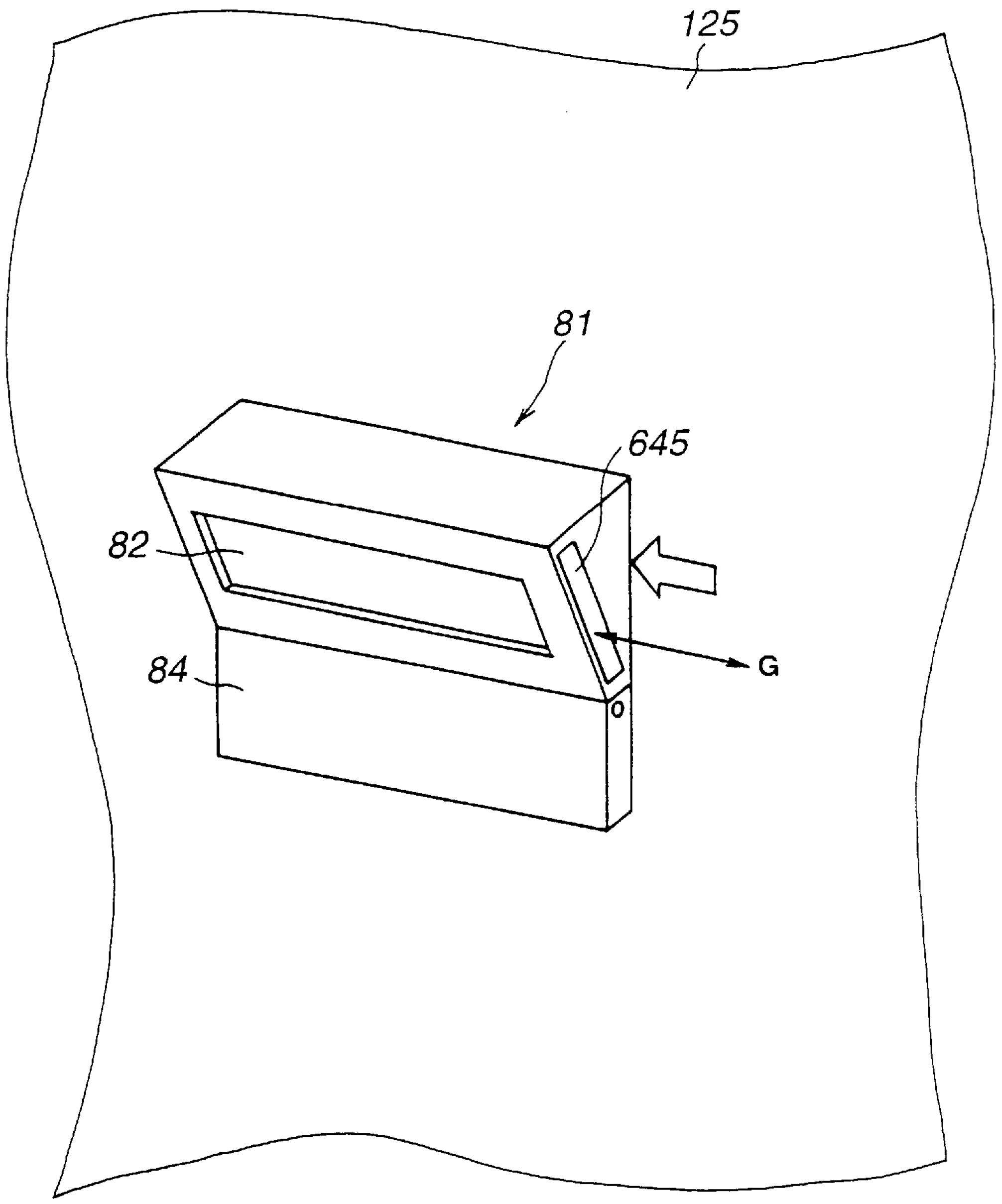
FIG. 25 is a perspective view where the card in inserted and removed in a horizontal direction.

FIG. 25 is a perspective view of the front mask cover 81 where the card in inserted and removed horizontally, and corresponds to FIG. 22.

In FIG. 25, the front mask cover 81 which is fixed on the front door 125 of the automatic vending machine is provided with a card insertion slot 645 for the purpose of inserting and removing the IC card in the direction denoted by the arrow G in the drawing. There is no cover on the card insertion slot 645, but a window 82 and banknote insertion slot 84 are provided as in the above embodiment.

In a structure of this sort, the stoppers (not depicted in the drawing) which are provided in the banknote-processing device must correspond to the direction denoted by the arrow G in the drawing, but apart from this the structure may be the same.

In the above embodiment, stoppers are driven in order to eject the card, but if the card insertion slot is made large enough to accept the fingers of a human hand or the window is left open, it is also possible to fix the position of the stoppers (which may be provided either on the banknote-processing device side or on the card holder side) and allow the user to eject the card himself.

In the banknote-processing device 71 to which the above embodiment pertains, the control unit 108 has controlled the whole banknote-processing device including the card reader/writer of the front mask cover 81, but the invention is not restricted to this, and it is possible for the card reader/writer of the front mask cover 81 to be controlled by a separate control unit from the control unit 108.

In the third banknote-processing device with a card reader/writer function to which the present invention pertains, the banknote-processing device with attached front mask and banknote insertion slot formed on the front of the body of the device is such that not only can the front mask cover which covers the front mask be freely attached to and detached from the body of the device, but this front mask cover is equipped with a card reader/writer function which records and reproduces information to and from the IC recording area of an IC card. This means that not only is there no need to reserve extra space within the automatic vending machine for the card reader/writer, but it is possible to attach a card reader/writer without imposing any restrictions of internal space in a self-service machine.

Moreover, the fact that not only is it possible freely to attach and detach the front mask cover which covers the front mask, but this front mask cover is equipped with a card reader/writer function which records and reproduces information to and from the IC recording area of an IC card means that it is possible to fit a front mask cover to a conventional banknote-processing device. Thus, it is possible to convert a conventional banknote-processing device into one with an IC card reader/writer simply by attaching the front mask cover. Similarly, if the front mask cover is removed, the banknote-processing device to which the present invention pertains reverts to a conventional banknote-processing device without any IC card reader/writer. It should be added that no structural modification is applied on the automatic vending machine side when these changes are effected.

In this manner it is possible to provide a banknote-processing device with a card reader/writer function without implementing any modifications to a conventional banknote-processing device. What is more, attaching a front mask cover with a card reader/writer function also makes it possible to eliminate damaging signal interference between the card reader/writer and the banknote identification unit of the banknote-processing device as far as is feasible.

Generally speaking, when a conventional banknote-processing device is attached to an automatic vending machine, the whole device save the banknote insertion slot is covered on the front of the automatic vending machine by a mechanically strong metal door, which makes it possible to prevent the banknote-processing device from being damaged from outside, as far as is feasible.

The first, second and third banknote-processing devices with attached card reader/writer to which the present invention pertains have an antenna comprising an antenna coil for the purpose of communication with the IC card. If a banknote-processing device with a card reader/writer function of this sort is fitted within an automatic vending machine and the whole device with the exception of the banknote insertion slot is covered with a metal door as described above, the magnetic property of the metal door causes noise to be generated, as a result of which the card reader/writer malfunctions. For this reason it is normal to locate the antenna outside the metal door, and for the metal door to cover all the banknote-processing device except the antenna and the banknote insertion slot. In this manner it is possible not only to prevent the card reader/writer from malfunctioning, but also to prevent the banknote-processing device from being damaged from outside, both as far as is feasible (cf. FIGS. 1, 13, 21).

However, when the first, second and third banknote-processing devices with attached card reader/writer to which the present invention pertains are fitted within an automatic vending machine, the antenna which constitutes the card reader/writer is located outside the mechanically strong metal door, rendering it mechanically weak and prone to damage from outside the banknote-processing device.

In particular, there is the risk that because the antenna is located on the front of the body of the device, it may be destroyed wilfully with a drill or similar tool, making it possible for banknotes to be removed from within the body of the device.

For this reason it is possible to form the whole antenna from tough non-magnetic material, so as to prevent as far as is feasible both malfunctioning of the IC card reader/writer and damage to the antenna from outside. In other words, the antennas denoted by the symbols 15 in FIG. 1, 31 in FIG. 11 and 111 in FIG. 21 are molded from a non-magnetic plastic containing small fragments of glass or ceramic, thus providing a tough non-magnetic body.

If the antennas 15, 31, 11 are molded in this manner from a tough non-magnetic plastic containing small fragments of glass or ceramic, while there is no guarantee that they will be protected by the door of the automatic vending machine, the fact that the antenna coils of the antennas 15, 31, 111 is molded from a tough non-magnetic plastic containing small fragments of glass or ceramic means that in themselves they are mechanically strong. In this manner it is possible to prevent the banknote-processing devices to which the present invention pertains from being damaged externally, and to prevent the antennas 15, 31, 111 from being destroyed with a drill or similar tool, and banknotes from being stolen from the stacker which is located behind it, both as far as is feasible.

It should be added that the antenna coils which constitute the antennas 15, 31, 111 have been formed by molding non-magnetic plastic containing small fragments of glass or ceramic, but the present invention is by no means restricted to this, and the antenna coils may be formed from any material so long as it is tough and non-magnetic.

As has been explained above, by molding the antenna coil of the card reader/writer which records and reproduces information to and from the IC recording area of the IC card from a non-magnetic plastic containing small fragments of glass or ceramic, it is possible render the antenna itself mechanically strong, thus making it possible to prevent the banknote-processing device with a card reader/writer function to which the present invention pertains from external damage, as far as is feasible.

Moreover, although the antenna is located on the front of the body of the device, it is of itself mechanically strong, as has been explained above. Thus it is possible to protect it from external damage, and thereby to prevent it from being destroyed with a drill or similar tool, and banknotes from being stolen from the stacker which is located behind it, both as far as is feasible.

In this manner it is possible to provide a banknote-processing device with a card reader/writer function wherein malfunctioning of the IC card reader/writer and external damage to the device are prevented as far as is feasible.

The present invention can be implemented in various other modes so long as these do not deviate from the spirit and principal characteristics thereof, for which reason the foregoing embodiments are to be construed as not being restrictive, and constituting in every respect no more than examples. The range of the present invention is demonstrated by the claims, and is in no way constricted by the text of the specification. In addition to this, all transformations and modifications pertaining to the claims are subsumed within them.

What is claimed is:

1. A banknote-processing device with a card reader/writer function, wherein an antenna for communicating with an IC card is provided in a front mask of the banknote-processing device;

the front mask is covered with a front mask cover; and a card holder for housing the IC card is provided in the front mask cover.

2. A banknote-processing device with a card reader/writer function, having a front mask cover within an aperture formed in a door of a body of an automatic vending machine in which the banknote-processing device is provided, wherein there is provided within the front mask cover a card holder for housing an IC card during communication via an antenna which is located in a prescribed position within the banknote-processing device.

3. The banknote-processing device with a card reader/writer function according to claim 2, wherein the card holder has a window for confirming presence or absence of an IC card within the card holder.

4. The banknote-processing device with a card reader/writer function according to claim 2, wherein the card holder has an aperture in at least part of a bottom portion thereof.

5. The banknote-processing device with a card reader/writer function according to claim 2, wherein the card holder has a cover at an insertion slot through which the IC card is inserted and removed, the cover being capable of opening and closing freely.

6. A banknote-processing device with a card reader/writer function, comprising:

a front mask provided at a front of a body of the banknote-processing device, the front mask having an aperture for inserting banknotes;

a front mask cover for covering the front mask, the front mask cover being detachably fitted to the body of the device; and a card reader/writer is provided within the front mask for the purpose of recording and reproducing information to and from the IC recording area of an IC card.

7. The banknote-processing device with a card reader/writer function according to claim 6, wherein the card reader/writer comprises:

an antenna located in a prescribed position in the front mask cover and communicating with the IC card; and a card holder located in a position opposing to the antenna, for housing the IC card.

8. The banknote-processing device with a card reader/writer function according to claim 7, wherein the card holder comprises card supporting/ejecting means for supporting the IC card and for ejecting the IC card once the communication with the IC card is terminated.

9. The banknote-processing device with a card reader/writer function according to claim 7, wherein the card holder comprises card detecting means for detecting presence or absence of the IC card, the communication being initiated when the presence of the card is detected by the card detecting means.

10. The banknote-processing device with a card reader/writer function according to claim 7, wherein the card holder has a window for confirming presence or absence of the IC card within the card holder.

11. The banknote-processing device with a card reader/writer function according to claim 7, wherein the card holder is formed with a hole for preventing accumulation of dust.

12. The banknote-processing device with a card reader/writer function according to claim 7, wherein the card holder has a card insertion slot through which the IC card is inserted, the card insertion slot being equipped with a cover for opening and closing the card insertion slot.

13. A banknote-processing device with a card reader/writer function, having an antenna comprising an antenna coil for communicating with an IC card so as to record and reproduce information to and from an IC recording area of the IC card, wherein the antenna coil is formed by molding with a non-magnetic plastic containing small fragments of glass or ceramic.

* * * * *